(12) United States Patent
Konegawa et al.

(10) Patent No.: US 11,119,274 B2
(45) Date of Patent: Sep. 14, 2021

(54) OPTICAL WAVEGUIDE, OPTO-ELECTRIC HYBRID BOARD, PRODUCING METHOD OF OPTICAL WAVEGUIDE, PRODUCING METHOD OF OPTO-ELECTRIC HYBRID BOARD, AND OPTO-ELECTRIC HYBRID MODULE

(71) Applicant: NITTO DENKO CORPORATION, Osaka (JP)

(72) Inventors: Naoto Konegawa, Osaka (JP); Yuichi Tsujita, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/640,260

(22) PCT Filed: Aug. 22, 2018

(86) PCT No.: PCT/JP2018/030911
§ 371 (c)(1),
(2) Date: Feb. 19, 2020

(87) PCT Pub. No.: WO2019/039492
PCT Pub. Date: Feb. 28, 2019

(65) Prior Publication Data
US 2020/0363587 A1 Nov. 19, 2020

(30) Foreign Application Priority Data

Aug. 22, 2017 (JP) .............................. JP2017-159296

(51) Int. Cl.
*G02B 6/122* (2006.01)
*G02B 6/13* (2006.01)
(Continued)

(52) U.S. Cl.
CPC ........... *G02B 6/1228* (2013.01); *G02B 6/122* (2013.01); *G02B 6/13* (2013.01); *G02B 6/132* (2013.01);
(Continued)

(58) Field of Classification Search
CPC ........ G02B 6/1228; G02B 6/13; G02B 6/138; G02B 6/4201; G02B 6/12004; G02B 6/122; G02B 6/132; G02B 6/4293
(Continued)

(56) References Cited

U.S. PATENT DOCUMENTS 5,143,577 A 9/1992 Haas et al.
2005/0164131 A1 7/2005 Yokouchi
(Continued)

FOREIGN PATENT DOCUMENTS

JP 2005-208651 A 8/2005
JP 2009-103827 A 5/2009
(Continued)

OTHER PUBLICATIONS

International Search Report Issued in PCT/JP2018/030911 dated Nov. 20, 2018.
(Continued)

*Primary Examiner* — Michael P Mooney
(74) *Attorney, Agent, or Firm* — Jean C. Edwards, Esq.; Edwards Neils LLC

(57) ABSTRACT

An optical waveguide includes a core extending in a transmission direction of light, a clad covering the core along the transmission direction, and a mixing layer containing a material for the core and a material for the clad on the interface between the core and the clad, and the mixing layer includes a plurality of regions each having a different thickness in the transmission direction.

10 Claims, 21 Drawing Sheets

(51) Int. Cl.
  *G02B 6/42* (2006.01)
  *G02B 6/132* (2006.01)
  *G02B 6/12* (2006.01)

(52) U.S. Cl.
  CPC ......... *G02B 6/4201* (2013.01); *G02B 6/4293* (2013.01); *G02B 6/12004* (2013.01)

(58) Field of Classification Search
  USPC .......................................... 385/43, 129–132
  See application file for complete search history.

(56) References Cited

U.S. PATENT DOCUMENTS

| | | | | |
|---|---|---|---|---|
| 2009/0269704 A1* | 10/2009 | Hodono | ................... | G02B 6/43 430/319 |
| 2011/0014575 A1* | 1/2011 | Hikita | ................... | G02B 6/138 430/321 |
| 2012/0077129 A1 | 3/2012 | Tsujita et al. | | |

FOREIGN PATENT DOCUMENTS

| | | |
|---|---|---|
| JP | 2011-039489 A | 2/2011 |
| JP | 2012-073358 A | 4/2012 |
| JP | 2012-163837 A | 8/2012 |
| JP | 2012-181428 A | 9/2012 |
| JP | 2014-167652 A | 9/2014 |

OTHER PUBLICATIONS

Written Opinion Issued in PCT/JP2018/030911 dated Nov. 20, 2018.

International Preliminary Report on Patentability issued by WIPO dated Feb. 25, 2020, in connection with International Patent Application No. PCT/JP2018/030911.

Office Action, issued by the Japanese Patent Office dated Jul. 6, 2021, in connection with Japanese Patent Application No. 2017-159296.

* cited by examiner

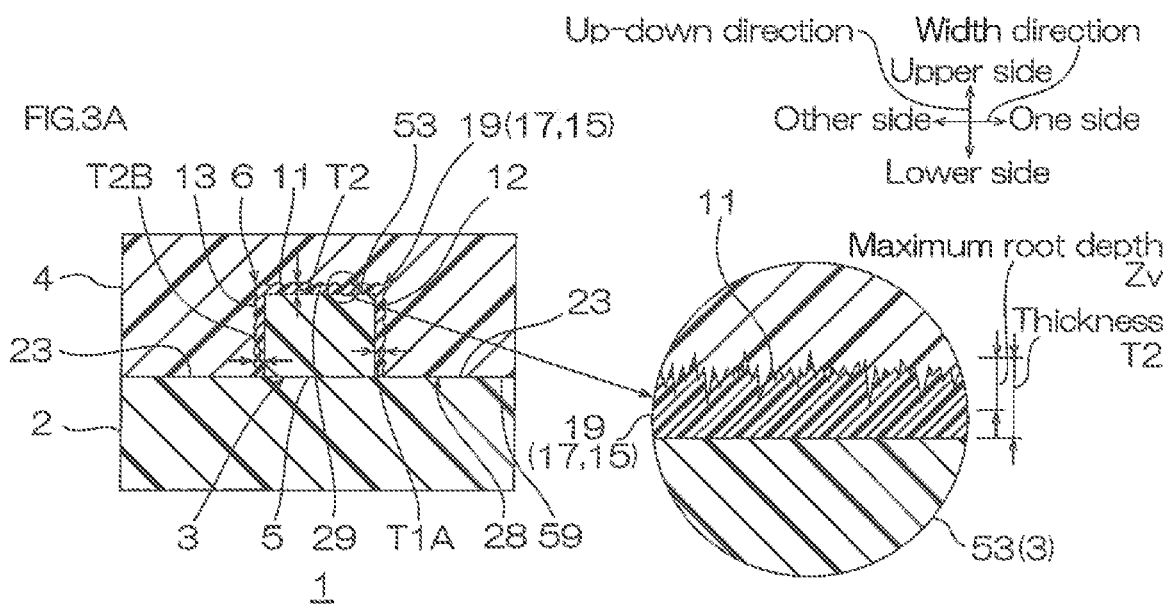
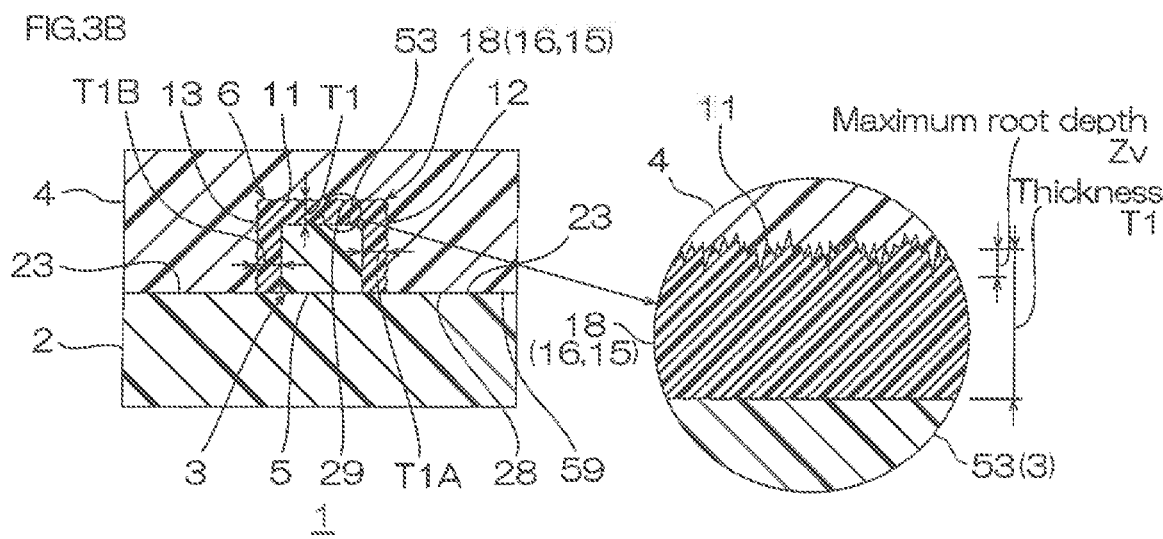
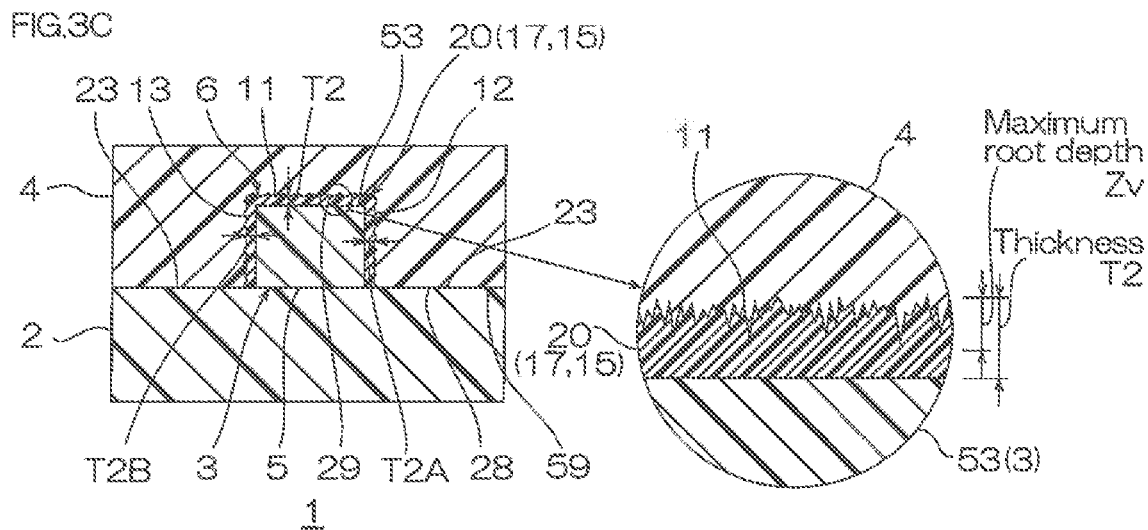

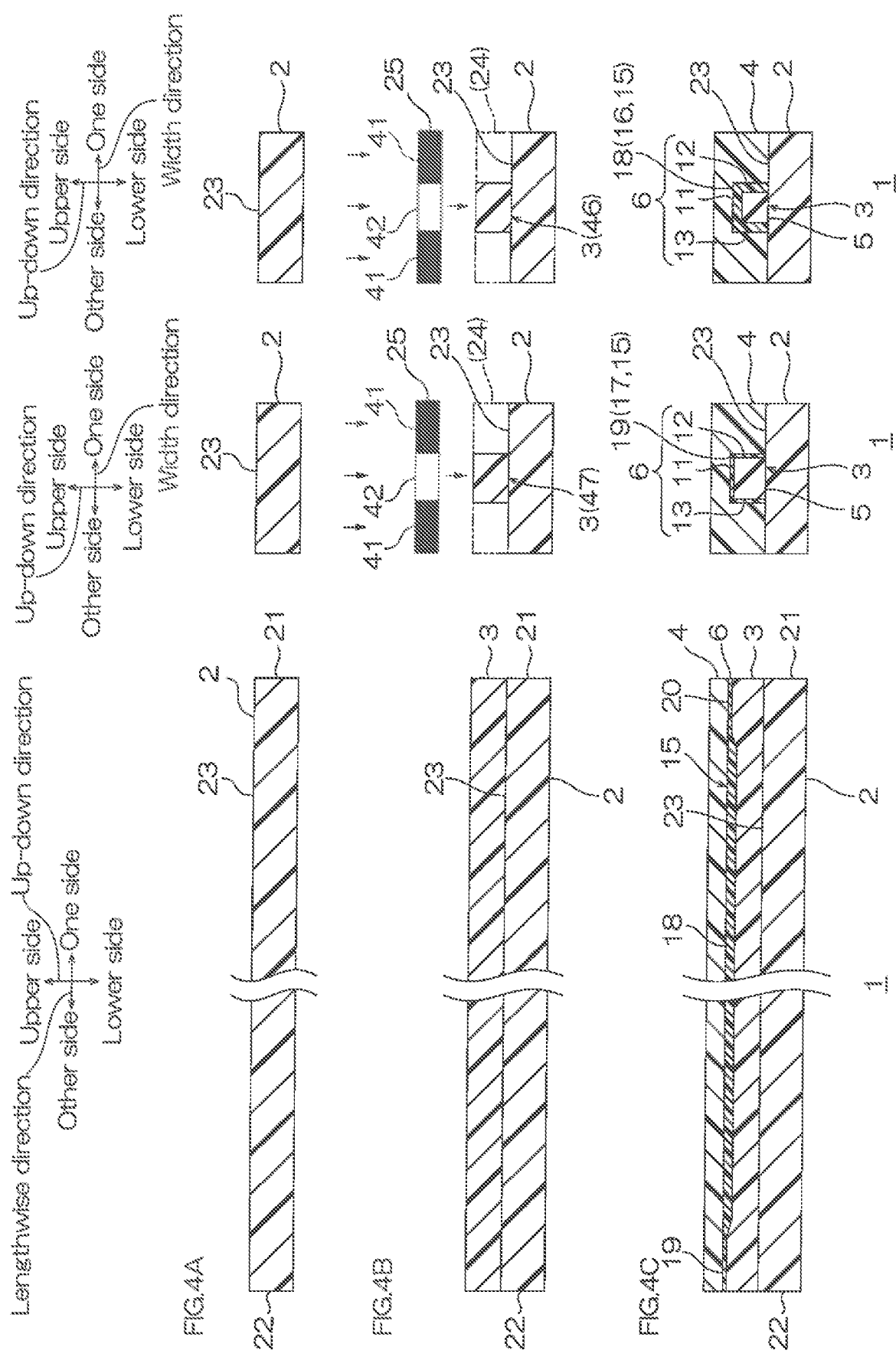

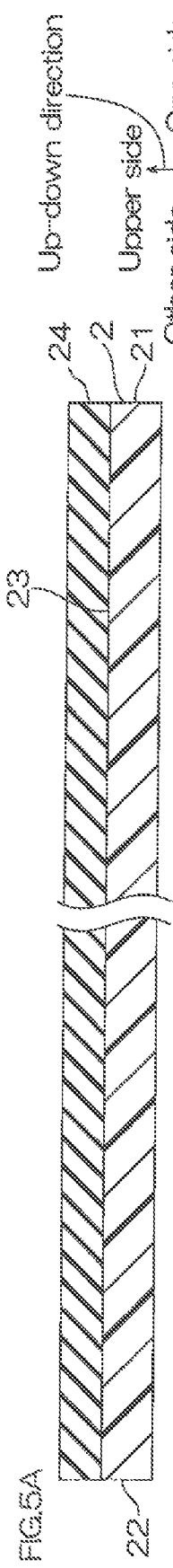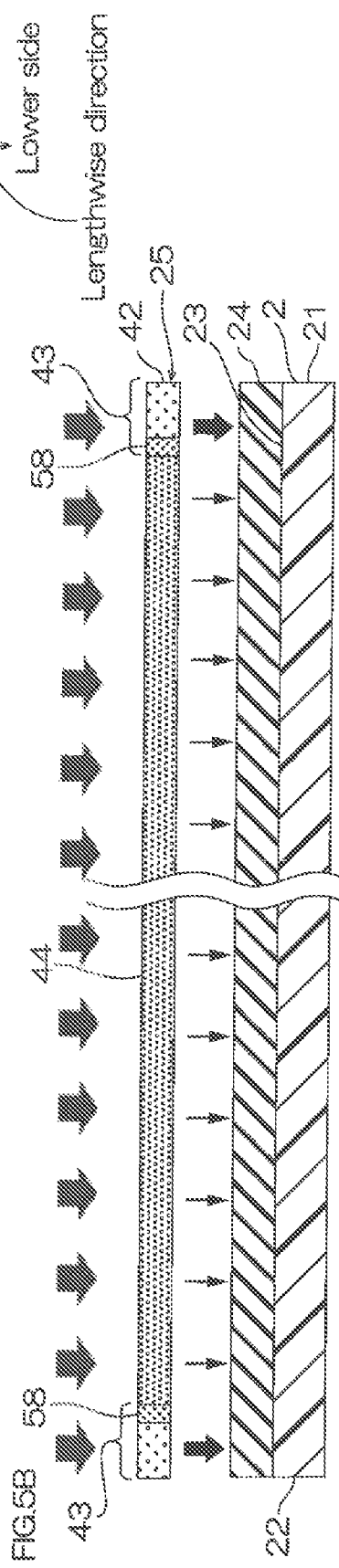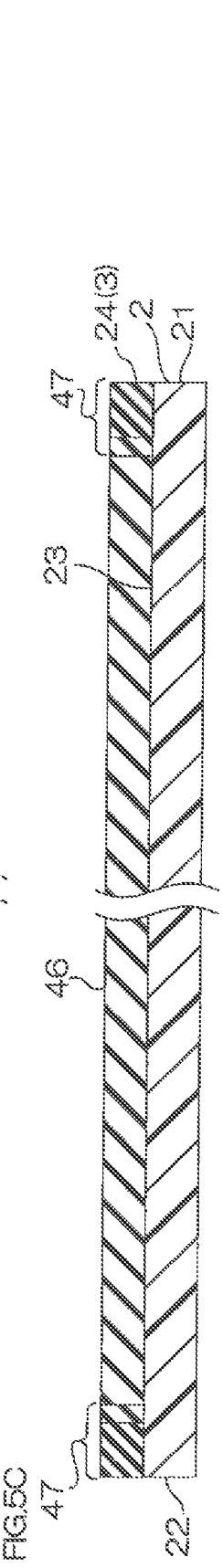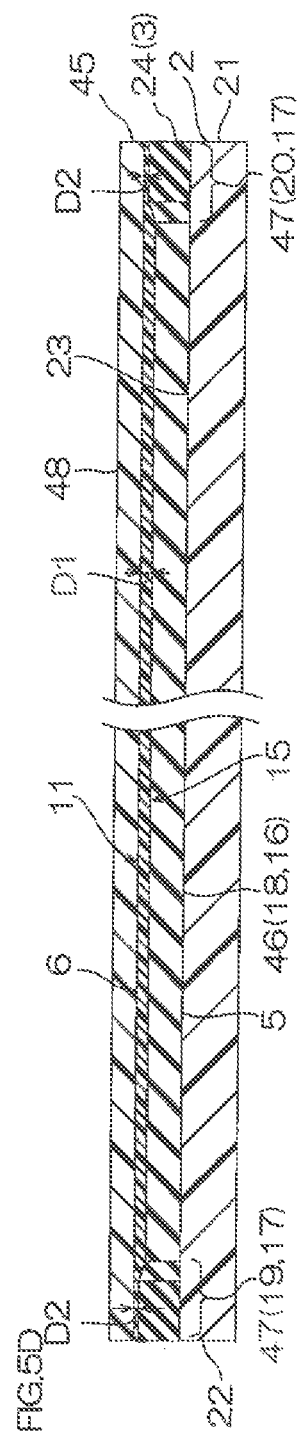

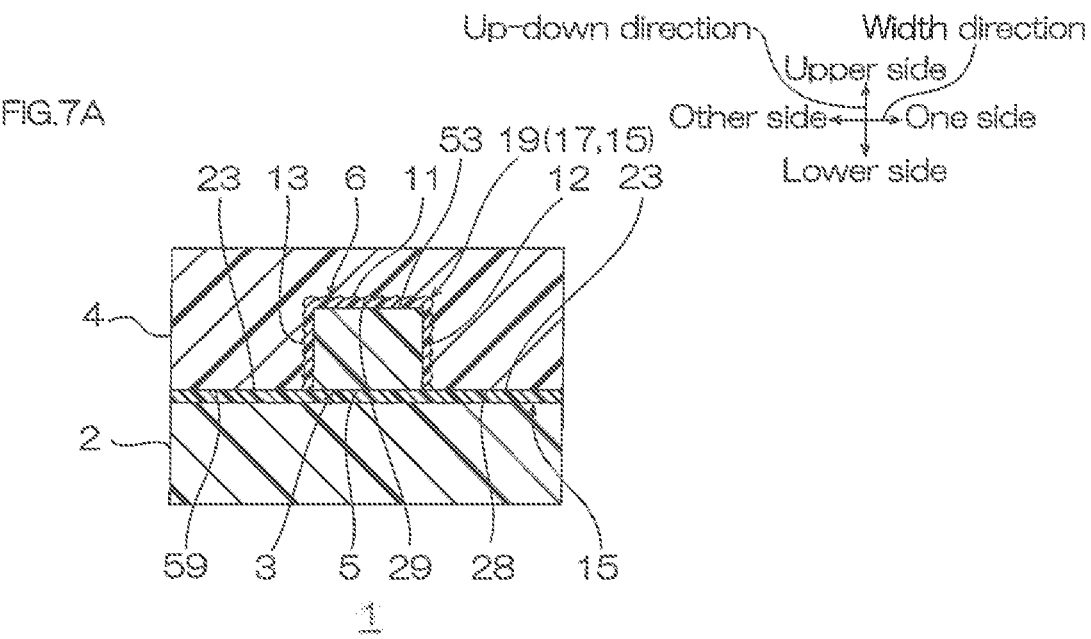
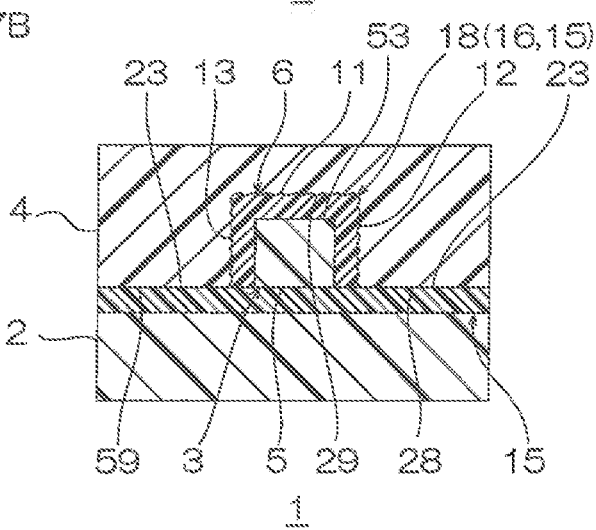# 
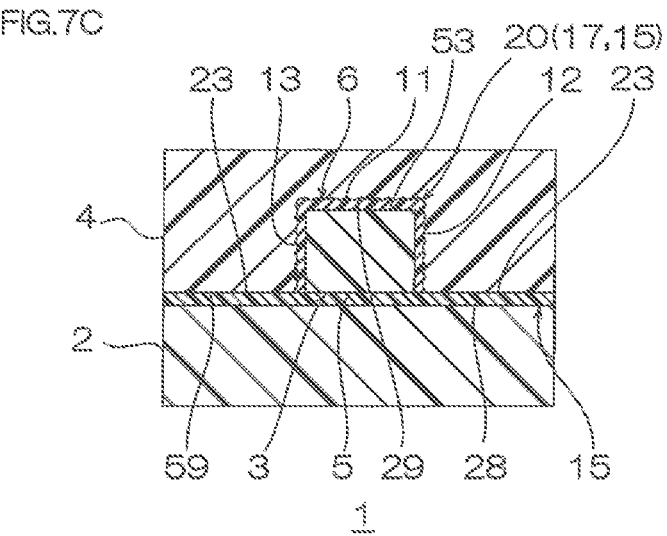

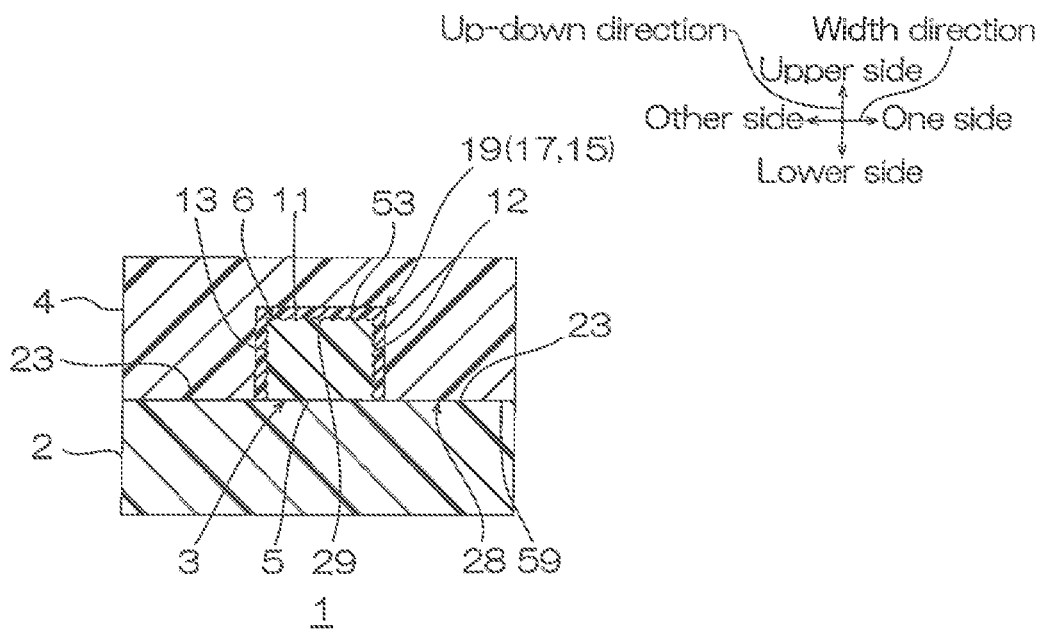
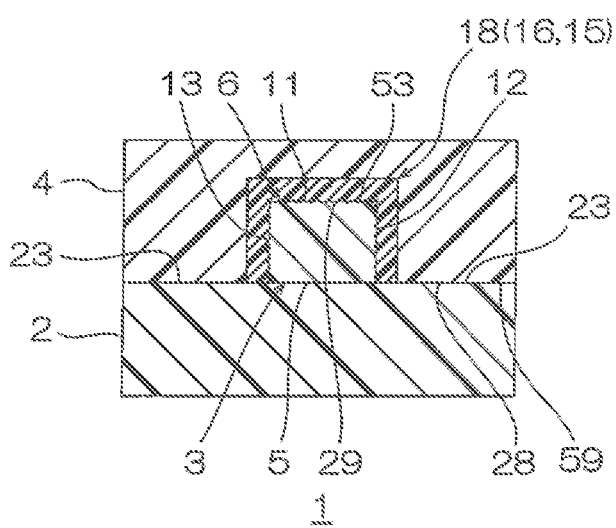
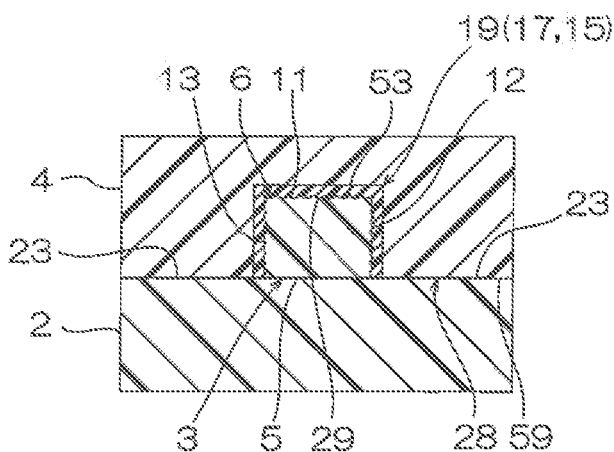

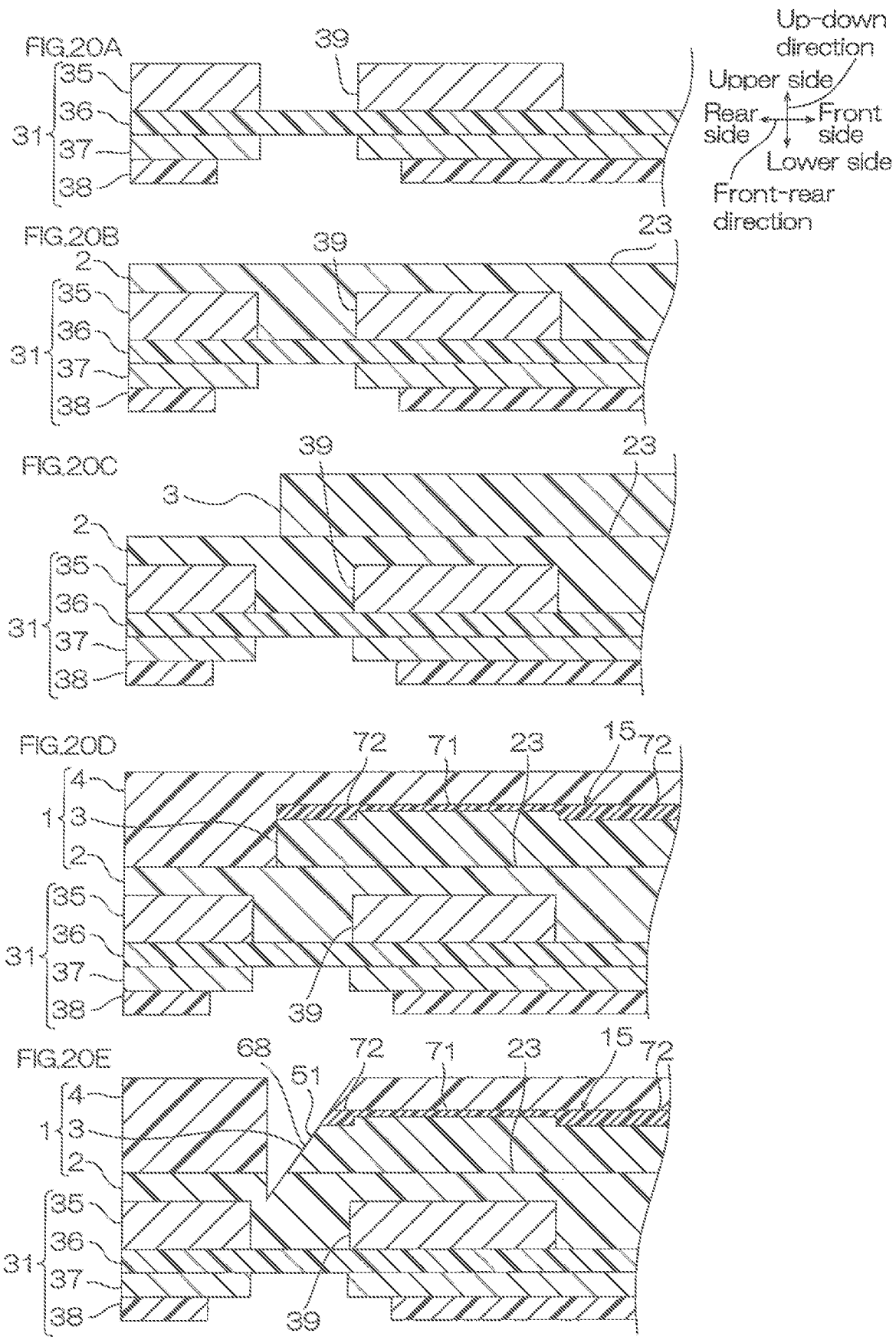

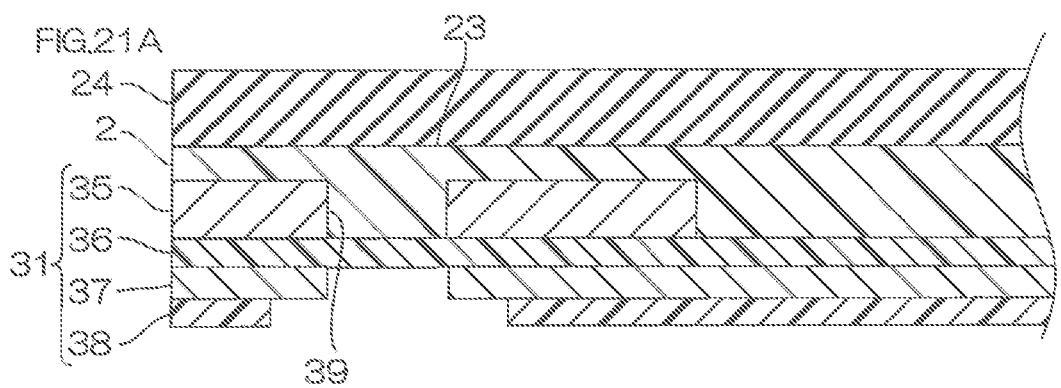
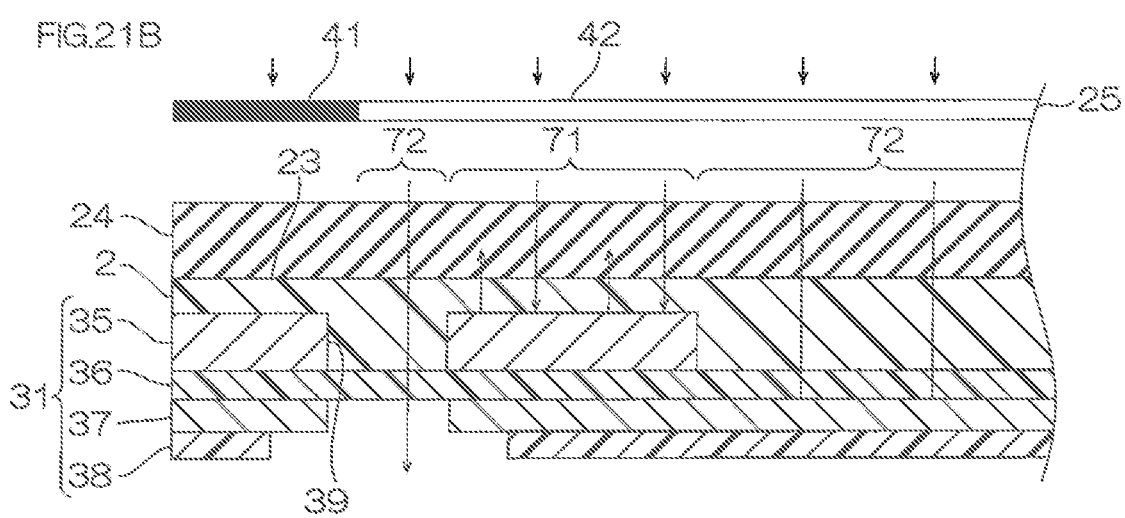
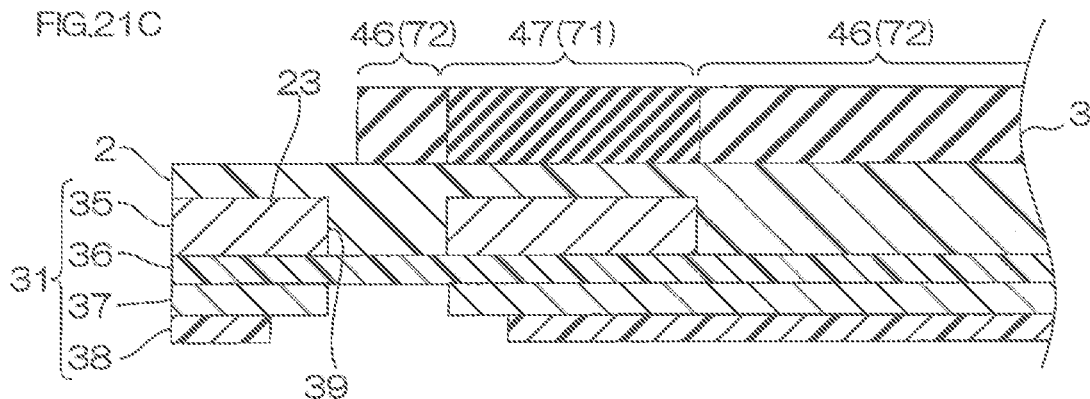
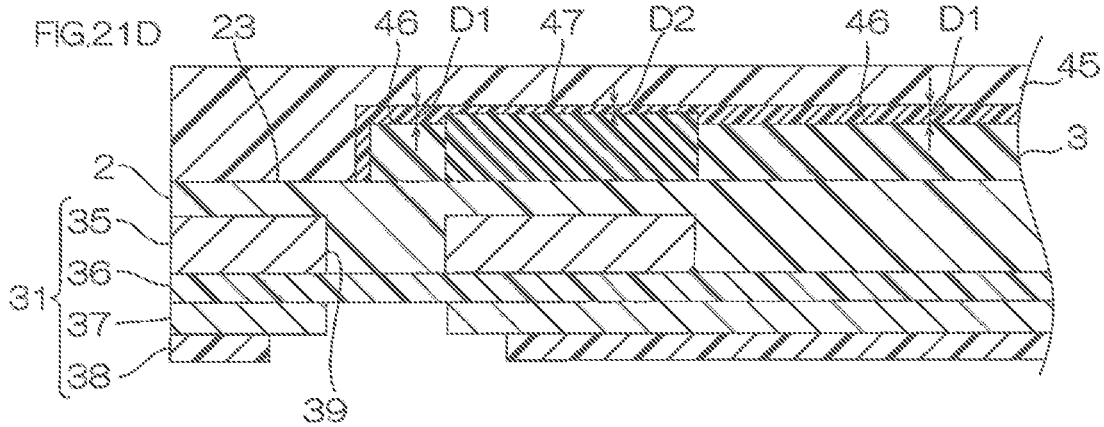

OPTICAL WAVEGUIDE, OPTO-ELECTRIC HYBRID BOARD, PRODUCING METHOD OF OPTICAL WAVEGUIDE, PRODUCING METHOD OF OPTO-ELECTRIC HYBRID BOARD, AND OPTO-ELECTRIC HYBRID MODULE

CROSS-REFERENCE TO RELATED APPLICATIONS

The present application is a 35 U.S.C. 371 National Stage Entry of PCT/JP2018/030911, filed on Aug. 22, 2018, which claims priority from Japanese Patent Application No. 2017-159296, filed on Aug. 22, 2017, the contents of all of which are herein incorporated by reference in their entirety.

TECHNICAL FIELD

The present invention relates to an optical waveguide, an opto-electric hybrid board, a method for producing an optical waveguide, a method for producing an opto-electric hybrid board, and an opto-electric hybrid module, to be specific, to an optical waveguide, an opto-electric hybrid board including the optical waveguide, an opto-electric hybrid module including the optical waveguide, a method for producing an optical waveguide, and a method for producing an opto-electric hybrid board.

BACKGROUND ART

Conventionally, an optical waveguide including an under clad layer, a core, and an over clad layer covering the core has been known. The optical waveguide optically connects components such as information processing components and information transmission components to each other, and transmits light therebetween.

As such an optical waveguide, for example, an optical waveguide for connectors including a mixing layer in which a resin component for forming the over clad layer infiltrates into a surface layer portion of the core and a resin component for the core is mixed with the resin component for the over clad has been proposed (ref: for example, Patent Document 1).

In the optical waveguide for connectors described in Patent Document 1, a refractive index of the mixing layer is smaller than that of the core, and thus, light at the inside of the core does not easily go through the mixing layer, so that a loss of the light on the surface of the core is reduced and thus, a loss of the light among the components is reduced.

CITATION LIST

Patent Document
Patent Document 1: Japanese Unexamined Patent Publication No. 2012-73358

SUMMARY OF THE INVENTION

Problem to be Solved by the Invention

Meanwhile, the optical waveguide for connectors may be required to be optically designed in accordance with specific uses and purposes.

However, in the optical waveguide for connectors described in Patent Document 1, there is a disadvantage that the thickness of the mixing layer is the same in a transmission direction, so that the optical design in accordance with various uses and purposes cannot be carried out.

The present invention provides an optical waveguide that is capable of optically designing in accordance with its uses and purposes, an opto-electric hybrid board, a method for producing an optical waveguide, a method for producing an opto-electric hybrid board, and an opto-electric hybrid module.

Means for Solving the Problem

The present invention (1) includes an optical waveguide including a core extending in a transmission direction of light, a clad covering the core along the transmission direction, and a mixing layer containing a material for the core and a material for the clad on the interface between the core and the clad, and the mixing layer includes a plurality of regions each having a different thickness in the transmission direction.

In the optical waveguide, the mixing layer includes the plurality of regions each having a different thickness in the transmission direction, so that the optical waveguide can be optically designed in accordance with its uses and purposes.

The present invention (2) includes the optical waveguide described in (1), wherein the mixing layer is included in the core.

In the optical waveguide, the mixing layer is included in the core, so that a loss of light transmitted at the inside of the core can be efficiently reduced.

The present invention (3) includes the optical waveguide described in (1) or (2), wherein in the entire region of the mixing layer, a thickness of the mixing layer is above a maximum valley depth $Zv$ of the interface between the core and the clad.

The interface between the core and the clad has a valley corresponding to the maximum valley depth $Zv$, that is, has unevenness. Then, there may be a case where the light is scattered on the interface, and a loss of the light is increased.

However, in the optical waveguide, in the entire region of the mixing layer, the thickness of the mixing layer is above the above-described maximum valley depth $Zv$, so that the light can surely go in the transmission direction in the mixing layer before reaching the interface. Thus, an increase of a loss of the light caused by scattering of the light on the interface can be suppressed.

The present invention (4) includes the optical waveguide described in any one of (1) to (3), wherein the plurality of regions include a thick layer region having a first thickness $T1$ and a thin layer region having a second thickness $T2$ that is thinner than the first thickness $T1$, and a ratio ($T1/T2$) of the first thickness $T1$ to the second thickness $T2$ is 1.5 or more.

In the optical waveguide, the ratio ($T1/T2$) of the first thickness $T1$ to the second thickness $T2$ is 1.5 or more, so that the optical waveguide can be furthermore optically designed in accordance with its uses and purposes by the thick layer region and the thin layer region.

The present invention (5) includes the optical waveguide described in any one of (1) to (4), wherein the plurality of regions include a first region positioned at an upstream-side end portion of the core in the transmission direction and a second region positioned at the downstream side with respect to the first region, and a thickness of the mixing layer in the second region is thicker than that of the mixing layer in the first region.

In the optical waveguide, the thickness of the mixing layer in the first region is thinner than that of the mixing layer in the second region. Thus, when an incident device of the light is disposed so as to face the upstream-side end portion of the core corresponding to the first region, the light emitted from the incident device can be efficiently received by the core corresponding to the thin mixing layer in the first region.

Meanwhile, the thickness of the mixing layer in the second region is thicker than that of the mixing layer in the first region. Thus, the light reaching the second region from the first region can be transmitted in the transmission direction by the core corresponding to the thick second region, to be specific, by a confinement effect of the light based on the thick mixing layer in the second region.

Thus, in the first region, the light from the incident device can be efficiently received, and in the second region, the light can be transmitted, while being confined.

The present invention (6) includes the optical waveguide described in any one of (1) to (5), wherein the plurality of regions include a third region positioned at the downstream-side end portion of the core in the transmission direction and a second region positioned at the upstream side with respect to the third region, and the mixing layer in the second region is thicker than the mixing layer in the third region.

In the optical waveguide, the mixing layer in the second region is thicker than the mixing layer in the third region. Thus, the light can be transmitted in the transmission direction by the confinement effect of the light based on the thick mixing layer in the second region.

Meanwhile, the mixing layer in the third region is thinner than the mixing layer in the second region. Thus, when the incident device of the light is disposed so as to face the downstream-side end portion of the core corresponding to the third region, the light from the core corresponding to the thin mixing layer in the third region can be efficiently received by a light receiving device.

As a result, in the second region, the light can be transmitted, while being confined, and in the third region, the light can be efficiently received by the light receiving device.

The present invention (7) includes an opto-electric hybrid board sequentially including the optical waveguide described in any one of (1) to (6) and an electric circuit board in a thickness direction.

The opto-electric hybrid board includes the above-described optical waveguide, so that it can be optically designed in accordance with its uses and purposes.

The present invention (8) includes the opto-electric hybrid board described in (7), wherein the electric circuit board includes a metal supporting layer; the optical waveguide has an overlapped region that is overlapped with the metal supporting layer and a non-overlapped region that is not overlapped with the metal supporting layer when projected in the thickness direction; and the mixing layer in the non-overlapped region is thicker than the mixing layer in the overlapped region.

The present invention (9) includes the opto-electric hybrid board sequentially including the optical waveguide described in (5) and an electric circuit board in the thickness direction and further including an optical element optically connected to the upstream-side end edge in the transmission direction of the core.

The opto-electric hybrid board further includes the optical element optically connected to the upstream-side end edge in the transmission direction of the core, so that in the first region, the light from the optical element can be efficiently received.

The present invention (10) includes an opto-electric hybrid module sequentially including the optical waveguide described in (6) and an electric circuit board in a thickness direction and further including an external optical circuit optically connected to a downstream-side end edge in the transmission direction of the core.

The opto-electric hybrid module further includes the external optical circuit optically connected to the downstream-side end edge in the transmission direction of the core, so that the light from the thick core corresponding to the third region can be efficiently received by the external optical circuit.

The present invention (11) includes a method for producing an optical waveguide for producing the optical waveguide including a core extending in a transmission direction of light and a clad covering the core along the transmission direction including a first step of forming the core, a second step of covering the core with a material for the clad to infiltrate from the surface of the core inwardly, and a third step of forming the clad from the material for the clad and forming a mixing layer containing a material for the core and the material for the clad on the interface between the core and the clad, wherein in the second step, in a plurality of regions in the transmission direction, an infiltrating depth of the material for the clad is made different.

In the second step of the method for producing an optical waveguide, in the plurality of regions in the transmission direction, the infiltrating depth of the material for the clad is made different, so that the mixing layer can include the plurality of regions each having a different thickness in the transmission direction.

The present invention (12) includes the method for producing an optical waveguide described in (11), wherein in the plurality of regions, a reaction rate of the core is made different.

In the method for producing an optical waveguide, in the plurality of regions, the reaction rate of the core is made different, so that in the second step, when the core is covered with the material for the clad, in the plurality of regions in the transmission direction, the infiltrating depth of the material for the clad can be easily and surely made different.

The present invention (13) includes a method for producing an opto-electric hybrid board for producing the opto-electric hybrid board sequentially including an electric circuit board including a metal supporting layer; an under clad layer, a core layer extending in a transmission direction of light; and an over clad layer covering a core along the transmission direction in a thickness direction including a step of preparing the electric circuit board, a step of forming an under clad on a one-side surface in the thickness direction of the electric circuit board, a first step of forming the core on the one-side surface in the thickness direction of the under clad by disposing a material for the core on the one-side surface in the thickness direction of the under clad and next, exposing the material for the core to light from one side toward the other side in the thickness direction to be then developed, and a third step of forming an over clad on the one-side surface in the thickness direction of the under clad to cover the core so as to allow a material for the over clad to infiltrate from the surface of the core inwardly.

In the first step of the method for producing an opto-electric hybrid board, the material for the core is exposed to light from one side toward the other side in the thickness direction, so that of the material for the core, the overlapped region that is overlapped with the metal supporting layer is excessively exposed to light by the light that is reflected on the metal supporting layer. Meanwhile, the non-overlapped region that is not overlapped with the metal supporting layer can be exposed to light as intended without excessive exposure to light as in the overlapped region.

Thus, the reaction rate of the material for the core corresponding to the overlapped region is lower than that of the material for the core corresponding to the non-overlapped region.

Thus, in the third step, the mixing layer in the overlapped region is thinner than the mixing layer in the non-overlapped region.

Accordingly, the thickness of the mixing layer can be easily made different based on the reflection by the metal supporting layer.

Effect of the Invention

The optical waveguide, the opto-electric hybrid board, the method for producing an optical waveguide, the method for producing an opto-electric hybrid board, and the opto-electric hybrid module can be optically designed in accordance with its uses and purposes.

BRIEF DESCRIPTION OF THE DRAWINGS

FIGS. 3A to 3C show front cross-sectional views of the optical waveguide shown in FIGS. 1 and 2:

FIG. 3A illustrating a cross-sectional view along an A-A line of an other-side region, FIG. 3B illustrating a cross-sectional view along a B-B line of an intermediate region, and FIG. 3C illustrating a cross-sectional view along a C-C line of a one-side region.

FIGS. 4A to 4C show process views for illustrating a method for producing an optical waveguide shown in FIGS. 1, 3A, and 3B:

FIG. 4A illustrating a step of forming an under clad layer,

FIG. 4B illustrating a first step of forming a core, and

FIG. 4C illustrating a third step of forming an over clad layer, and in FIGS. 4A to 4C, the left-side view illustrating a step corresponding to FIG. 1, the central view illustrating a step corresponding to FIG. 3A, and the right-side view illustrating a step corresponding to FIG. 3B.

FIGS. 5A to 5C show process views for illustrating the details of the first to third steps shown in FIGS. 4B to 4C:

FIG. 5A illustrating a step of forming a photosensitive film,

FIG. 5B illustrating a step of exposing the photosensitive film to light via a photomask, FIG. 5C illustrating a step of forming a core having a low reaction rate portion and a high reaction rate portion, and FIG. 5D illustrating a step of infiltrating an over clad resin into the core.

FIG. 6A illustrating a cross-sectional view of an other-side region,

FIG. 6B illustrating a cross-sectional view of an intermediate region, and

FIG. 6C illustrating a cross-sectional view of a one-side region.

FIGS. 7A to 7C show front cross-sectional views of a modified example of the optical waveguide (modified example in which a mixing layer is also included in an under clad layer and faces the core and an outer-side portion thereof) shown in FIGS. 3A to 3C:

FIG. 7A illustrating a cross-sectional view of an other-side region.

FIG. 7B illustrating a cross-sectional view of an intermediate region, and

FIG. 7C illustrating a cross-sectional view of a one-side region.

FIGS. 8A to 8C show front cross-sectional views of a modified example of the optical waveguide (modified example in which a mixing layer is included in an over clad layer) shown in FIGS. 3A to 3C:

FIG. 8A illustrating a cross-sectional view of an other-side region,

FIG. 8B illustrating a cross-sectional view of an intermediate region, and

FIGS. 9A to 9C show front cross-sectional views of a modified example of the optical waveguide (modified example in which a mixing layer is included in only a core and is along a first interface and a second interface) shown in FIGS. 6A to 6C:

FIG. 9A illustrating a cross-sectional view of an other-side region,

FIG. 9B illustrating a cross-sectional view of an intermediate region, and

FIG. 10A illustrating a cross-sectional view of an other-side region,

FIG. 10B illustrating a cross-sectional view of an intermediate region, and

FIG. 10C illustrating a cross-sectional view of a one-side region.

FIG. 19A illustrating a cross-sectional view along an A-A line,

FIG. 19B illustrating a cross-sectional view along a B-B line, and

FIG. 19C illustrating a cross-sectional view along a C-C line.

FIGS. 20A to 20E show process views for illustrating a method for producing the opto-electric hybrid board shown in FIG. 18:

FIG. 20A illustrating a step of preparing an electric circuit board,

FIG. 20B illustrating a step of forming an under clad layer,

FIG. 20C illustrating a step of forming a core,

FIG. 20D illustrating a step of forming an over clad layer, and

FIG. 20E illustrating a step of forming a mirror surface.

FIGS. 21A to 21C show process views for illustrating the details of the steps of FIGS. 20C and 20D:

FIG. 21A illustrating a step of forming a photosensitive film,

FIG. 21B illustrating a step of exposing the photosensitive film to light via a photomask, FIG. 21C illustrating a step of forming a core, and FIG. 21D illustrating a step of infiltrating an over clad resin into the core.

DESCRIPTION OF EMBODIMENTS (Optical Waveguide)

An optical waveguide 1 that is a one embodiment of an optical waveguide of the present invention is described with reference to FIGS. 1 to 5D.

Figure 1:
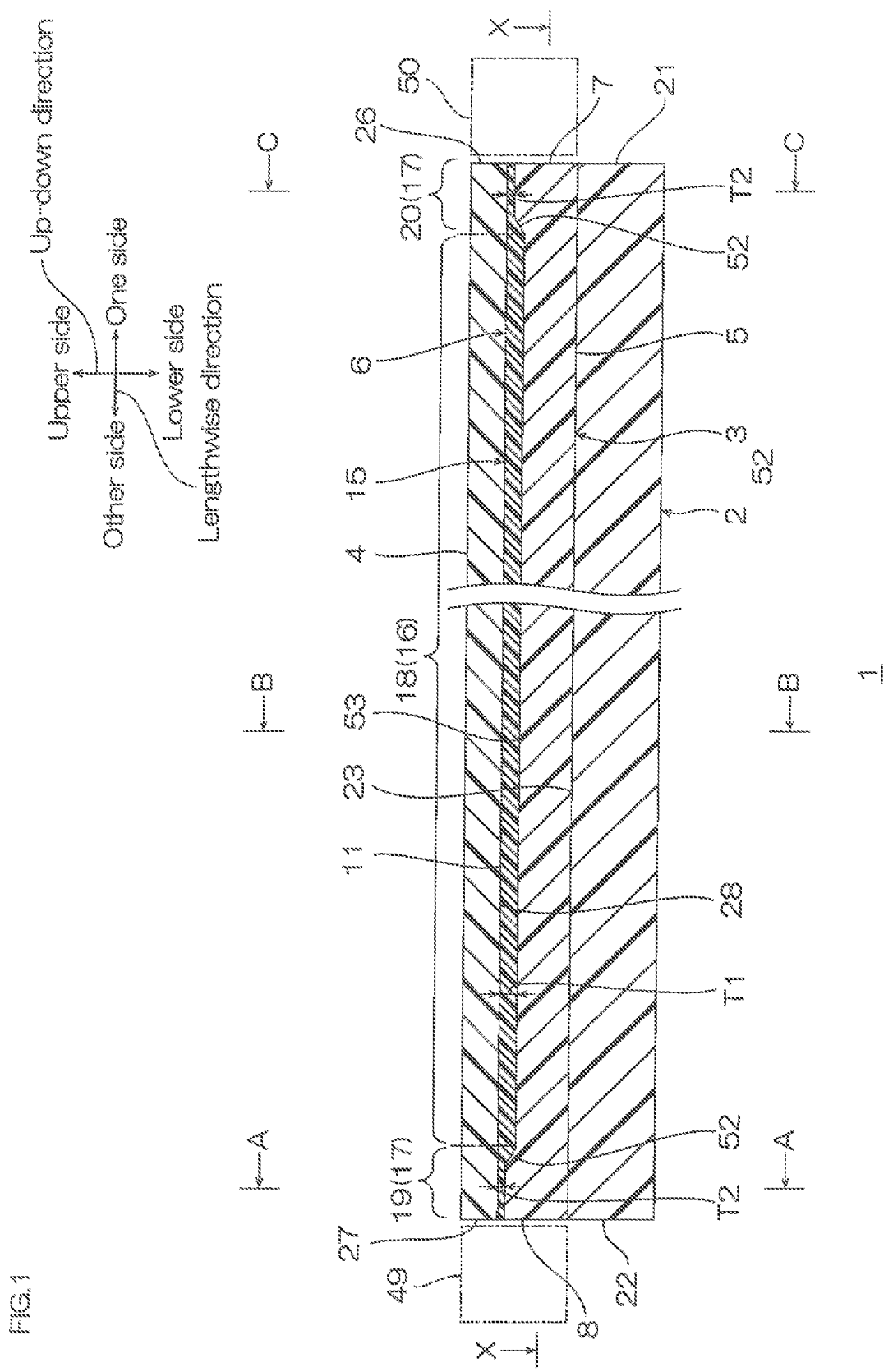
FIG. 1 shows a side cross-sectional view of a one embodiment of an optical waveguide of the present invention.
Figure 2:
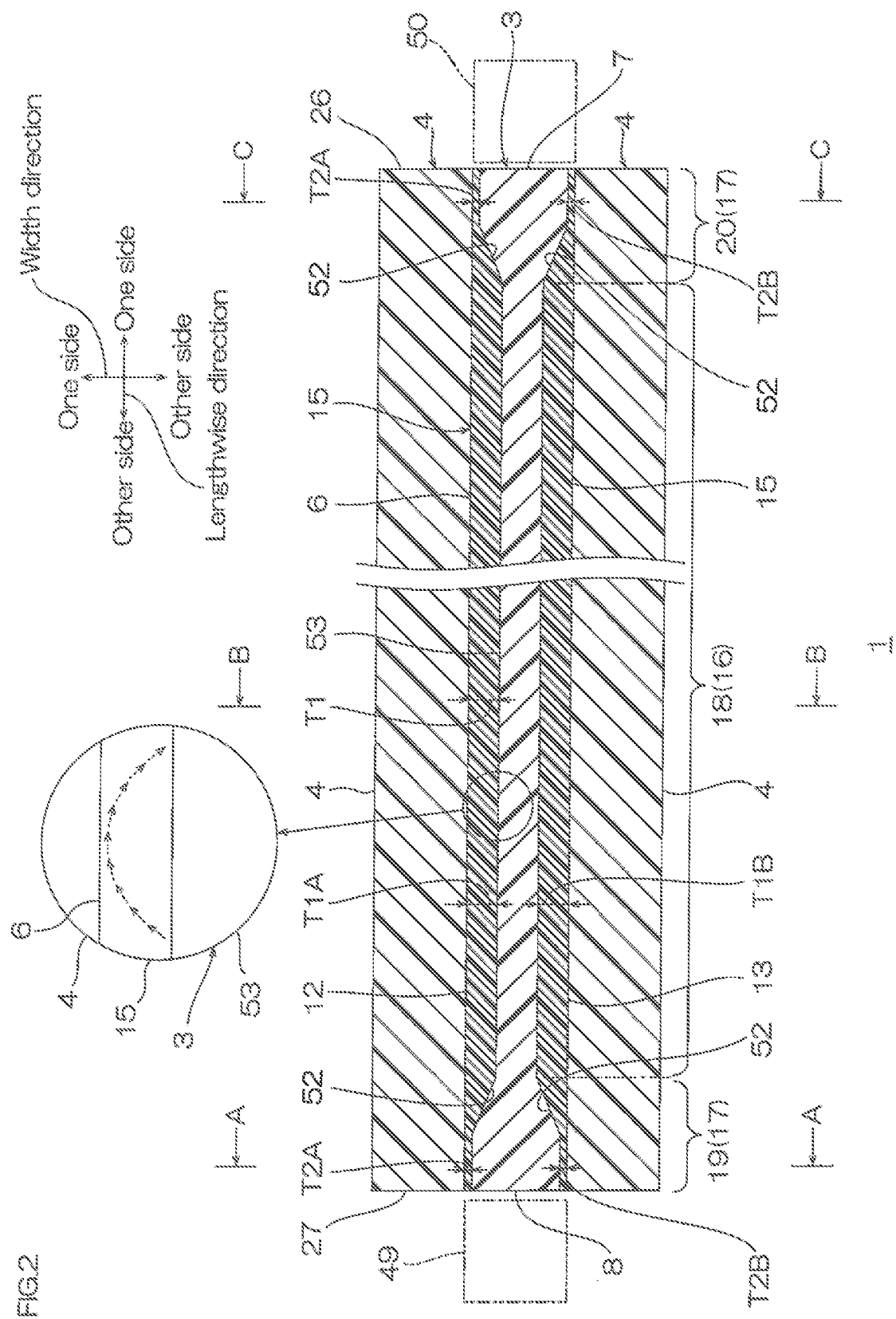
FIG. 2 shows a plan cross-sectional view along an X-X line of the optical waveguide shown in FIG. 1.

In FIGS. 1 and 2, the right-left direction on the plane of the sheet is a lengthwise direction of the optical waveguide 1 (transmission direction of light, first direction). The right side on the plane of the sheet is one side in the lengthwise direction (one example of a downstream side in the transmission direction, one side in the first direction), and the left side on the plane of the sheet is the other side in the lengthwise direction (one example of an upstream side in the transmission direction, the other side in the first direction).

In FIG. 1, the up-down direction on the plane of the sheet is an up-down direction of the optical waveguide 1 (direction perpendicular to the transmission direction, second direction perpendicular to the first direction). The upper side on the plane of the sheet is an upper side (one side in the thickness direction, one side in the second direction), and the lower side on the plane of the sheet is a lower side (the other side in the thickness direction, the other side in the second direction).

In FIG. 2, the up-down direction on the plane of the sheet is a width direction of the optical waveguide 1 (direction perpendicular to the transmission direction and the thickness direction, third direction perpendicular to the first direction and the second direction). The upper side on the plane of the sheet is one side in the width direction (one side in the third direction), and the lower side on the plane of the sheet is the other side in the width direction (the other side in the third direction).

To be specific, directions are in conformity with direction arrows of each view.

The definition of the directions does not mean to limit the directions at the time of the production and the use of the optical waveguide 1.

As shown in FIGS. 1 and 2, the optical waveguide 1 has a generally rectangular flat plate shape when viewed from the top extending in the lengthwise direction (same as "when projected in the thickness direction"). The optical waveguide 1 transmits light from the other side to one side in the lengthwise direction.

The optical waveguide 1 is, for example, a strip-type optical waveguide. The optical waveguide 1 sequentially includes an under clad layer 2 as one example of a clad, a core 3, and an over clad layer 4 as one example of a clad upwardly. To be more specific, the optical waveguide 1 includes the under clad layer 2, the core 3 disposed on the upper surface of the under clad layer 2 (an under-side upper surface 23 to be described later), and the over clad layer 4 disposed on the upper surface of the under clad layer 2 (the under-side upper surface 23) so as to cover the core 3. The optical waveguide 1 preferably consists of only the under clad layer 2, the core 3, and the over clad layer 4.

The under clad layer 2 has a generally rectangular plate shape extending in the lengthwise direction. To be specific, the under clad layer 2 has an under-side one surface 21 in the lengthwise direction, an under-side other surface 22 in the lengthwise direction, and the under-side upper surface 23 that connects the upper end edge of the under-side one surface 21 in the lengthwise direction to that of the under-side other surface 22 in the lengthwise direction. The under-side other surface 22 in the lengthwise direction is disposed so as to face the other side in the lengthwise direction of the under-side one surface 21 in the lengthwise direction. The under-side upper surface 23 is the upper surface of the under clad layer 2, and is a flat surface.

As a material for the under clad layer 2, for example, a resin having transparency is used, preferably, a resin having insulating properties and transparency is used. To be specific, examples of the material for the under clad layer 2 include epoxy resin, polyamic acid resin, polyimide resin, acrylic resin, and norbornene resin.

A total light transmittance of the under clad layer 2 is, for example, 70% or more.

A refractive index of the under clad layer 2 is appropriately set.

A thickness of the under clad layer 2 is, for example, 2 μm or more, preferably 10 μm or more, and for example, 600 μm or less, preferably 40 μm or less.

The core 3 is in contact with the under-side upper surface 23. As shown in FIGS. 3A to 3C, the core 3 has a generally rectangular shape when viewed in front cross-sectional view (cross-sectional view cut in a surface perpendicular to the lengthwise direction (surface along the up-down direction and the width direction)). As shown in FIG. 2, the core 3 has a generally linear shape (to be more specific, rectangular shape) when viewed from the top extending in the lengthwise direction.

As shown in FIG. 1, the core 3 has a first interface 5 that is the border with the under clad layer 2, a second interface 6 that is the border with the over clad layer 4 to be described next, a one-end surface 7 in the lengthwise direction, and an other-end surface 8 in the lengthwise direction.

The first interface 5 is the lower surface of the core 3, and the interface between the core 3 and the under clad layer 2. The first interface 5 has a flat surface in conformity with the under-side upper surface 23. That is, the first interface 5 is a flat surface. As shown in FIGS. 3A to 3C, of the under-side upper surface 23 of the under clad layer 2, a portion in contact with the core 3 forms the first interface 5.

The second interface 6 is the upper surface and the side surfaces of the core 3. The second interface 6 is, for example, a rough surface compared to the first interface 5. To be specific, the second interface 6 continuously has a core upper surface 11, a core one surface 12 in the width direction, and a core other surface 13 in the width direction.

The core upper surface 11 is the upper surface of the core 3. The core upper surface 11 is substantially parallel with the first interface 5. The core upper surface 11 has subtle unevenness. Thus, a maximum valley depth Zv is, for example, 1 nm or more, preferably 10 nm or more, and for example, 1000 nm or less, preferably 500 nm or less. The maximum valley depth Zv is measured based on JIS B0601 (in 2009). The following maximum valley depth Zv is measured in the same manner as the description above.

The core one surface 12 in the width direction is the one-side surface in the width direction of the core 3, and a side surface (connecting surface) that connects the one end edge in the width direction of the first interface 5 to that in the width direction of the core upper surface 11. The core one surface 12 in the width direction has, for example, subtle unevenness, and the maximum valley depth Zv thereof is the same as that of the core upper surface 11.

The core other surface 13 in the width direction is the other-side surface in the width direction of the core 3, and a side surface (connecting surface) that connects the other end edge in the width direction of the first interface 5 to that in the width direction of the core upper surface 11. The core other surface 13 in the width direction is parallel with the core one surface 12 in the width direction. The core other surface 13 in the width direction has, for example, subtle unevenness, and the maximum valley depth Zv thereof is the same as that of the core upper surface 11.

As shown in FIG. 1, the one-end surface 7 in the lengthwise direction is the end surface (connecting surface) that connects the one end edge in the lengthwise direction of the first interface 5 to that in the lengthwise direction of the second interface 6. The one-end surface 7 in the lengthwise direction is flush with the under-side one surface 21 in the lengthwise direction of the under clad layer 2. The one-end surface 7 in the lengthwise direction is a flat surface. The one-end surface 7 in the lengthwise direction is an exposed surface exposed outwardly (one side in the lengthwise direction).

The other-end surface 8 in the lengthwise direction is the end surface (connecting surface) that connects the other end edge in the lengthwise direction of the first interface 5 to that in the lengthwise direction of the second interface 6. The other-end surface 8 in the lengthwise direction is flush with the under-side other surface 22 in the lengthwise direction of the under clad layer 2. The other-end surface 8 in the lengthwise direction is a flat surface. The other-end surface 8 in the lengthwise direction is an exposed surface exposed outwardly (the other side in the lengthwise direction).

The core 3 includes a mixing layer 15 (described later) containing a material for the core 3 and a material for the over clad layer 4 to be described next on the second interface 6.

As the material for the core 3, a resin having a high refractive index and having excellent insulating properties and excellent transparency is selected, and to be specific, the resin is selected from the resin illustrated in the under clad layer 2.

The total light transmittance of the core 3 is, for example, 50% or more.

The refractive index of an inner portion 53 (inner portion with respect to the mixing layer 15 to be described later, or a core effective portion) of the core 3 is higher than that of the under clad layer 2, and to be specific, is, for example, 100.1% or more, preferably 101% or more with respect to 100% of the refractive index of the under clad layer 2. The refractive index of a surface layer of the core 3 is the refractive index of the mixing layer 15 to be described later.

The thickness of the core 3 is, for example, 5 μm or more, preferably 30 μm or more, and for example, 100 μm or less, preferably 70 μm or less. The length (width) in the width direction of the core 3 is, for example, 1 μm or more, preferably 3 μm or more, and for example, 20 μm or less, preferably 10 μm or less.

The over clad layer 4 covers the core 3 along the lengthwise direction. As shown in FIGS. 3A to 3C, to be specific, the over clad layer 4 is in contact with the core upper surface 11 of the core 3, the core one surface 12 in the width direction, the core other surface 13 in the width direction, and an outer-side portion (portion that is not overlapped with the core 3 when viewed from the top) of the first interface 5 of the under-side upper surface 23 of the under clad layer 2.

As shown in FIG. 1, the over clad layer 4 has the same outer shape as that of the under clad layer 2 when viewed from the top. The over clad layer 4 has a generally sheet (flat plate) shape extending in a front-rear direction. To be specific, the over clad layer 4 has an over-side one surface 26 in the lengthwise direction, an over-side other surface 27 in the lengthwise direction, and an over-side lower surface 28 (ref: FIGS. 3A to 3C).

The over-side one surface 26 in the lengthwise direction is flush with the under-side one surface 21 in the lengthwise direction of the under clad layer 2 and the one-end surface 7 in the lengthwise direction of the core 3.

The over-side other surface 27 in the lengthwise direction is disposed so as to face the other side in the lengthwise direction of the over-side one surface 26 in the lengthwise direction at spaced intervals thereto. The over-side other surface 27 in the lengthwise direction is flush with the under-side other surface 22 in the lengthwise direction of the under clad layer 2 and the other-end surface 8 in the lengthwise direction of the core 3.

As shown in FIGS. 3A to 3C, the over-side lower surface 28 is the lower surface of the over clad layer 4, and has a shape in conformity with the shape of the core 3. To be specific, the over-side lower surface 28 continuously has an outer-side lower surface 59 that is positioned at the outer side of the core 3 and a recessed portion 29 that is positioned at the inner side thereof.

The outer-side lower surface 59 is in contact with the under-side upper surface 23 of the under clad layer 2.

The recessed portion 29 is continuous to the inner end edge in the width direction of the outer-side lower surface 59, and forms the core 3 and the second interface 6.

The refractive index of the over clad layer 4 is set lower than that of the core 3. Preferably, the refractive index of the over clad layer 4 is the same as that of the under clad layer 2.

A material for the over clad layer 4 is selected from the material that satisfies the above-described refractive index. To be specific, a resin having a low refractive index and excellent insulating properties and excellent transparency is selected. To be more specific, the same resin as that of the under clad layer 2 is selected. The thickness of the over clad layer 4 is, for example, 2 μm or more, preferably 5 μm or more, and for example, 600 μm or less, preferably 40 m or less.

As shown in FIGS. 1 and 2, the mixing layer 15 is provided along the lengthwise direction in the core 3. To be specific, as shown in FIGS. 3A to 3C, the mixing layer 15 is present (included) in the second interface 6 and at the inner side thereof.

The mixing layer 15 includes a plurality of regions each having a different thickness in the lengthwise direction. To be specific, as shown in FIGS. 1 and 2, the mixing layer IS includes a thick layer region 16 and a thin layer region 17.

The thick layer region 16 has a first thickness T1 that is relatively thick. The thick layer region 16 is an intermediate region 18 as one example of a second region. To be specific, the intermediate region 18 is a region excluding the one end portion and both end portions in the lengthwise direction in the core 3, and a region provided in the middle therebetween.

As shown in FIG. 3, the first thickness T1 in the intermediate region 18 includes the thickness T1 of the mixing layer 15 along the core upper surface 11, a thickness TA of the mixing layer 15 along the core one surface 12 in the width direction, and a thickness T1B of the mixing layer 15 along the core other surface 13 in the width direction in the intermediate region 18. Preferably, the above-described thickness T1 of the mixing layer 15 along the core upper surface 11 is the same as the thickness T1A of the mixing layer 15 along the core one surface 12 in the width direction and the thickness T1B of the mixing layer 15 along the core other surface 13 in the width direction.

As shown in FIGS. 1 and 2, the first thickness T1 is the same (uniform) over the lengthwise direction of the intermediate region 18.

The presence and the thickness of the mixing layer 15 (the thick layer region 16 and the thin layer region 17) are calculated by Raman spectroscopic analysis by specifying a region in which a ratio of the material for the over clad layer 4 in the mixing layer 15 is, for example, 50 mass %.

To be specific, the thickness of the mixing layer 15 is measured as follows. First, by using a Raman spectroscope (SNOM/AFM/Raman complex machine, manufactured by WITec K.K., alpha300RSA), the material for the core 3 is subjected to the Raman intensity measurement, and a peak wavelength at the highest intensity that is characteristic of the material for the core 3 is determined as a scan wavelength $\lambda 1$ ($cm^{-1}$). Next, the mixing layer 15 is cross-sectionally subjected to the Raman measurement in the scan wavelength $\lambda 1$ in a region from the over clad layer 4 that is positioned at 20 μm at one side in the width direction of the core 3 through the core one surface 12 in the width direction and the core other surface 13 in the width direction to the over clad layer 4 that is positioned at 20 μm at the other side in the width direction so as to cross the effective portion 53 of the core 3 in which the mixing layer 15 is formed. The intensity profile is standardized so that the minimum value is 0% and the maximum value is 100%. In the standardized Raman intensity profile, a lower limit intensity value k1 is obtained based on the average value of the Raman intensity of 0 to 5% in the coordinates from the core one surface 12 in the width direction to the position of 20 μm at one side in the width direction thereof. In the same manner, an upper limit intensity value k2 is obtained based on the average value of the Raman intensity of 95 to 100% in the coordinates from the core central portion to the position of ±10 μm. Furthermore, intermediate point coordinates Xm corresponding to a half of the Raman intensity of k1 and k2 are obtained from an intersection point at which the Raman profile and the value of (k1+k2)/2 intersect. Then, a tangent line of the Raman profile is drawn in the intermediate point coordinates Xm, and the intersection points with the lower limit value k1 and the upper limit value k2 are defined as lower limit coordinates X1 and upper limit coordinates X2, respectively. A difference |X2−X1| between the upper limit coordinates and the lower limit coordinates that are calculated therefrom is defined as the thickness (μm) of the mixing layer 15.

The first thickness T1 in the thick layer region 16 (the intermediate region 18) is, for example, above the maximum valley depth Zv of the second interface 6. To be more specific, the first thickness T1 of the thick layer region 16 is, for example, 0.01 μm or more, preferably 0.1 μm or more, and for example, 20 μm or less.

The thin layer region 17 has a second thickness T2 that is relatively thin. To be specific, the thin layer region 17 has the second thickness T2 that is thinner than the first thickness T1 of the thick layer region 16. The thin layer region 17 is a region (outer-side region or end portion region) that is positioned at one side and the other side in the lengthwise direction (both outer sides in the lengthwise direction) of the thick layer region 16. To be specific, the thin layer region 17 independently has an other-side region 19 as one example of a first region that is positioned at the other end portion in the lengthwise direction of the core 3, and a one-side region 20 as one example of a third region that is positioned at the one end portion in the lengthwise direction of the core 3. The other-side region 19, the intermediate region 18, and the one-side region 20 are continuous. The other-side region 19, the intermediate region 18, and the one-side region 20 in this order are disposed toward one side in the lengthwise direction.

As shown in FIG. 3A, the second thickness T2 in the other-side region 19 includes the thickness T2 of the mixing layer 15 along the core upper surface 11, a thickness T2A of the mixing layer 15 along the core one surface 12 in the width direction, and a thickness T2B of the mixing layer 15 along the core other surface 13 in the width direction in the other-side region 19. Preferably, the above-described thickness T2 of the mixing layer 15 along the core upper surface 11 is the same as the thickness T2A of the mixing layer 15 along the core one surface 12 in the width direction and the thickness T2B of the mixing layer 15 along the core other surface 13 in the width direction.

A ratio (T1/T2) of the first thickness T1 in the intermediate region 18 with respect to the second thickness T2 in the other-side region 19 is, for example, 1.5 or more, and for example, 2000 or less. When the ratio of T1/T2 is the above-described lower limit or more, or the above-described upper limit or less, in the intermediate region 18 (the thick layer region 16), the light can be surely transmitted in the lengthwise direction, and the other-end surface 8 in the lengthwise direction of the other-side region 19 can surely receive the light from an incident device 49.

The second thickness T2 in the other-side region 19 can continuously change in a region (neighboring region) 52 that is continuous to the intermediate region 18. To be specific, in the neighboring region 52, the second thickness T2 is gradually thickened toward one side in the lengthwise direction. The rate of change of the second thickness T2 in the neighboring region 52 is appropriately set.

Meanwhile, the second thickness T2 in a portion other than the above-described neighboring region 52 in the other-side region 19 is the same over the lengthwise direction.

The length in the lengthwise direction of the other-side region 19 is not particularly limited, and 1 μm or more.

As shown in FIGS. 3A and 3C, the second thickness T2 in the one-side region 20 is the same as the second thickness T2 in the above-described other-side region 19.

The second thickness T2 in the one-side region 20 can continuously change in the region (neighboring region) 52 that is continuous to the intermediate region 18. To be specific, in the neighboring region 52, the second thickness 12 is gradually thickened toward the other side in the lengthwise direction.

A ratio (T1/T2) of the first thickness T1 in the intermediate region 18 with respect to the second thickness T2 in the one-side region 20 is, for example, 1.5 or more, and for example, 2000 or less. When the ratio of T1/T2 is the above-described lower limit or more, or the above-described upper limit or less, in the intermediate region 18 (the thick layer region 16), the light can be surely transmitted in the lengthwise direction, and the light can be surely emitted from the one-end surface 7 in the lengthwise direction of the one-side region 20 to a light receiving device 50.

Accordingly, the second thickness T2 of the thin layer region 17 is, for example, above the maximum valley depth Zv of the second interface 6, while being thin with respect to the first thickness T1 of the thick layer region 16. In this manner, the first thickness T1 in the thick layer region 16 and the second thickness T2 in the intermediate region 18 are, for example, above the maximum valley depth Zv of the second interface 6. To be specific, the second thickness 12 of the thin layer region 17 is, for example, 0.01 μm or more, preferably 0.05 μm or more, and for example, 2 μm or less.

A ratio of the material for the over clad layer 4 in the mixing layer 15 with respect to the total amount of the materials for the core 3 and the over clad layer 4 is, for example, 50 mass % or more, and for example, below 100 mass %, preferably 90 mass % or less. The ratio of the material for the over clad layer 4 is, for example, calculated by the same method as the description above by the Raman spectroscopic analysis.

In FIGS. 1 to 3C, the mixing layer 15 is illustrated by being separated from the inner portion 53 in the core 3 via a clear border. Alternatively, for example, though not shown (cannot be shown), an outline of the mixing layer 15 (border between the mixing layer 15 and the inner portion 53) is not clear. In this case, the mixing layer 15 is a region in which the ratio of the material for the over clad layer 4 with respect to the total amount of the materials for the core 3 and the over clad layer 4 is 50 mass % or more.

Next, a method for producing the optical waveguide 1 is described with reference to FIGS. 4A to 5D.

As shown in FIGS. 4A to 4C, the method for producing the optical waveguide 1 includes a step of forming the under clad layer 2 (ref: FIG. 4A), a first step of forming the core 3 (ref: FIG. 4B), and a third step of forming the over clad layer 4 and forming the mixing layer 15 (ref: FIG. 4C).

As shown in FIG. 4A, in the step of forming the under clad layer 2, for example, the under clad layer 2 is formed (or prepared) from the above-described resin in accordance with a known method. The under clad layer 2 is formed into a sheet shape having the under-side one surface 21 in the lengthwise direction, the under-side other surface 22 in the lengthwise direction, and the under-side upper surface 23 (or, the under clad layer 2 formed in a sheet shape in advance is prepared).

As shown in FIG. 4B, in the first step, next, the core 3 is formed on the under-side upper surface 23 of the under clad layer 2.

As shown in FIG. 5A, to form the core 3, for example, a varnish containing the above-described resin, a photoacid generator, and a solvent is applied to the under-side upper surface 23, and subsequently, the varnish is dried (the solvent is removed), so that a photosensitive film 24 made from a photosensitive resin composition is formed. The photosensitive film 24 is formed into a sheet shape on the entire upper surface of the under-side upper surface 23. Or, the photosensitive film 24 that is formed into a sheet shape from a dry film resist in advance is disposed on the under-side upper surface 23.

Thereafter, as shown in FIGS. 5B to 5D and 4B, thereafter, the core 3 is formed by a photolithography method.

To be specific, first, as shown in FIG. 4B, a photomask 25 having a light shielding portion 41 and a light transmittance portion 42 is disposed at the upper side of the photosensitive film 24.

The light shielding portion 41 has a reversed pattern (inverted pattern) to the core 3, and is constituted to allow the light reaching the photosensitive film 24 to be shielded at the next exposure to light.

The light transmittance portion 42 has the same pattern as the core 3, and is constituted to allow a required amount of the light reaching the photosensitive film 24 to pass (transmit) through at the next exposure to light.

As shown in FIG. 5B, the light transmittance portion 42 has a gradation pattern so that gradation exposure to light can be carried out at the time of the exposure to light of the photomask 25. The light transmittance portion 42 has, for example, two types of regions each having a different light transmittance. To be specific, the light transmittance portion 42 has a first light transmittance region 43 and a second light transmittance region 44 having a lower light transmittance than that of the first light transmittance region 43.

The first light transmittance region 43 has a relatively high light transmittance. The first light transmittance region 43 has the same pattern as that of the core 3 corresponding to the thin layer region 17. That is, the first light transmittance region 43 is positioned in both end portions in the lengthwise direction in the light shielding portion 41.

The second light transmittance region 44 has a lower light transmittance than that of the first light transmittance region 43. The second light transmittance region 44 has the same pattern as that of the core 3 corresponding to the thick layer region 16. The second light transmittance region 44 is continuously positioned at the inner side of the two first light transmittance regions 43.

The light transmittance of the first light transmittance region 43 and the second light transmittance region 44 is appropriately adjusted by a known halftone mask or the like.

In a region that is connected to the second light transmittance region 44 in the first light transmittance region 43 (region corresponding to the neighboring region 52), a light transmittance changing region 58 in which the light transmittance thereof gradually gets closer to the light transmittance of the second light transmittance region 44 toward the second light transmittance region 44 is provided.

Next, as shown by an arrow of FIG. 5B, the photosensitive film 24 is exposed to light via the photomask 25. To be specific, an ultraviolet ray is applied (exposed to light) from the upper side of the photomask 25 to the photosensitive film 24 via the photomask 25.

Then, as referred to the central view and the right-side view of FIG. 4B, the light is shielded in the light shielding portion 41, and the photosensitive film 24 facing the light shielding portion 41 is not exposed to light (does not receive the light).

Meanwhile, as shown in FIG. 5B, in the light transmittance portion 42, a required amount of the light transmits, and the photosensitive film 24 facing the light transmittance portion 42 is exposed to light. To be more specific, in the second light transmittance region 44, a relatively small amount of light transmits, while in the first light transmittance region 43, a relatively large amount of light transmits.

A transmittance amount of the light in the second light transmittance region 44 is smaller than the transmittance amount of the light in the first light transmittance region 43. The transmittance amount of the light in the light transmittance changing region 58 is reduced toward the second light transmittance region 44.

Thus, an amount of the exposed light (amount of the received light) of the photosensitive film 24 corresponding to the first light transmittance region 43 is relatively large, and the amount of the exposed light (amount of the received light) of the photosensitive film 24 corresponding to the second light transmittance region 44 is relatively small. That is, the amount of the exposed light of the photosensitive film 24 corresponding to the second light transmittance region 44 is smaller than the amount of the exposed light of the photosensitive film 24 corresponding to the first light transmittance region 43. Thus, a reaction rate of the photosensitive film 24 corresponding to the second light transmittance region 44 based on an acid derived from the photoacid generator is lower than that of the photosensitive film 24 corresponding to the first light transmittance region 43. The reaction rate of the photosensitive film 24 corresponding to the light transmittance changing region 58 is reduced toward the photosensitive film 24 corresponding to the second light transmittance region 44.

Thus, a low reaction rate portion 46 corresponding to the second light transmittance region 44 and a high reaction rate portion 47 corresponding to the first light transmittance region 43 in the photosensitive film 24 are formed as a portion corresponding to the light transmittance portion 42 in the photosensitive film 24.

Subsequently, the photosensitive film 24 is developed. In this manner, as shown in FIG. 4B, a portion corresponding to the light transmittance portion 42 (the low reaction rate portion 46 and the high reaction rate portion 47) remains, and a portion corresponding to the light shielding portion 41 is removed. At this time, in the development, a developing solution erodes the portion corresponding to the light shielding portion 41, so that a rough surface (uneven surface) is formed on the core upper surface 11, the core one surface 12 in the width direction, and the core other surface 13 in the width direction. The rough surface has the above-described maximum valley depth Zv.

In this manner, the core 3 having the low reaction rate portion 46 and the high reaction rate portion 47 is formed.

As shown in FIG. 5D, thereafter, the core 3 is covered with the material for the over clad layer 4.

Examples of the material for the over clad layer 4 include the resin and the photoacid generator described above, and a varnish 45 is prepared by further adding a solvent thereto.

As shown in FIG. 5D, to be specific, the varnish 45 is applied onto the under-side upper surface 23 of the under clad layer 2 so as to cover the core 3.

At this time, the varnish 45 is applied so that a liquid surface 48 of the varnish 45 is higher than the core upper surface 11 of the core 3.

When the varnish 45 is applied, the resin that is the material for the over clad layer 4 (hereinafter, simply referred to as "over clad resin") infiltrates from the second interface 6 of the core 3 into the inside.

At this time, a relatively large amount of over clad resin infiltrates into the low reaction rate portion 46, while a relatively small amount of over clad resin infiltrates into the high reaction rate portion 47. That is, a larger amount of over clad resin infiltrates into the low reaction rate portion 46 than an amount of the over clad resin that infiltrates into the high reaction rate portion 47.

Furthermore, an infiltrating depth D1 of the over clad resin in the low reaction rate portion 46 is relatively deep, while an infiltrating depth D2 of the over clad resin in the high reaction rate portion 47 is relatively shallow. That is, the infiltrating depth D1 of the over clad resin in the low reaction rate portion 46 is deeper than the infiltrating depth D2 of the over clad resin in the high reaction rate portion 47.

In short, the varnish 45 is applied to the low reaction rate portion 46 and the high reaction rate portion 47, and the infiltrating depth of the over clad resin is made different from each other.

Thereafter, the varnish is dried (the solvent is removed), and a film made from the over clad resin is formed to be subsequently developed, and if necessary, heated (heated after the exposure to light). The reaction of the over clad resin that infiltrates into the core 3 progresses by heating.

In this manner, in a surface layer portion of the core 3 (inner side layer positioned at the inner side of the second interface 6), the mixing layer 15 having both of the over clad resin and the resin as the material for the core 3 (hereinafter, simply referred to as "core resin") is formed. The material for the mixing layer 15 is a mixture of the over clad resin and the core resin. The refractive index of the mixing layer 15 is between the refractive index of the inner portion 53 of the core 3 and that of the over clad layer 4.

As shown in FIG. 4C, in this manner, the third step in which the mixing layer 15 is formed, and the over clad layer 4 is formed is carried out. At this time, in each of the neighboring regions in which the other-side region 19 and the one-side region 20 of the mixing layer 15 are connected to the intermediate region 18, the thickness changes.

In this manner, the over clad layer 4 is formed.

In this manner, the optical waveguide 1 including the under clad layer 2, the core 3, and the over clad layer 4 is produced.

Thereafter, as shown in FIG. 1, the incident device 49 of the light is disposed so as to face the other-end surface 8 in the lengthwise direction of the core 3, so that the core 3 is optically connected to the incident device 49. Also, the light receiving device 50 is disposed so as to face the one-end surface 7 in the lengthwise direction of the core 3, so that the core 3 is optically connected to the light receiving device 50.

In this manner, the incident device 49 is optically connected to the light receiving device 50 by the optical waveguide 1.

In the optical waveguide 1, the mixing layer 15 includes a plurality of regions each having a different thickness in the lengthwise direction, so that the optical waveguide 1 can be optically designed in accordance with its uses and purposes.

In the optical waveguide 1, the mixing layer 15 is included in the core 3, so that a loss of the light transmitted at the inside of the core 3 can be efficiently reduced.

The second interface 6 has a valley corresponding to the maximum valley depth Zv, that is, has unevenness. Then, there may be a case where the light is scattered on the second interface 6, and a loss of the light is increased.

However, in the optical waveguide 1, in the entire region of the mixing layer 15, the thickness of the mixing layer 15 is above the above-described maximum valley depth Zv, so that the light can surely go in the transmission direction in the mixing layer 15 before reaching the second interface 6. Thus, an increase of a loss of the light caused by scattering of the light on the second interface 6 can be suppressed.

The refractive index of the mixing layer 15 is smaller than that of the inner portion 53 of the core 3. Thus, the light that goes from the inner portion 53 toward the mixing layer 15 is reflected in the mixing layer 15 and goes back to the mixing layer 15. Among all, the mixing layer 15 may have a gradation (gradation, concentration gradient) in which the ratio of the over clad resin is increased from the inner portion 53 toward the second interface 6. By the gradation of the ratio of the over clad resin, as shown by a circled enlarged view of FIG. 2, the light that goes from the inner portion 53 toward the second interface 6 in the mixing layer 15 is pushed back to the inner portion 53, while drawing a curved track to go back to the inner portion 53. This is the above-described confinement effect of the light, and the thicker the mixing layer 15 is, the higher this effect is.

When the ratio (T1/T2) of the first thickness T1 of the thick layer region 16 to the second thickness 12 of the thin layer region 17 is 1.5 or more, the optical waveguide 1 can be surely optically designed in accordance with its uses and purposes by the thick layer region 16 and the thin layer region 17.

To be specific, as shown in FIG. 1, in the optical waveguide 1, the thickness 12 of the mixing layer 15 in the other-side region 19 is thinner than the thickness T1 of the mixing layer 15 in the intermediate region 18. In other words, the thickness of the inner portion (core effective thickness) of the core 3 corresponding to the intermediate region 18 is thicker than the thickness of the inner portion (core effective thickness) of the core 3 corresponding to the other-side region 19. Thus, when the incident device 49 of the light is disposed so as to face the other-end surface 8 in the lengthwise direction of the core 3 corresponding to the other-side region 19, the light emitted from the incident device 49 can be efficiently received by the thick core effective portion (the inner portion 53 of the core 3).

Meanwhile, the thickness T1 of the mixing layer 15 in the intermediate region 18 is thicker than the thickness T2 of the mixing layer 15 in the other-side region 19. Thus, the light entering the intermediate region 18 can be efficiently transmitted in the lengthwise direction by a confinement effect of the light based on the intermediate region 18 having the thick thickness T1.

Thus, in the other-side region 19, the light from the incident device 49 can be efficiently received, and in the intermediate region 18, the light can be transmitted, while being effectively confined.

Furthermore, in the optical waveguide 1, the thickness T2 of the mixing layer 15 in the one-side region 20 is thinner than the thickness T1 of the mixing layer 15 in the intermediate region 18. In other words, the thickness of the inner portion (core effective thickness) of the core 3 corresponding to the intermediate region 18 is thicker than the thickness of the inner portion (core effective thickness) of the core 3 corresponding to the one-side region 20. Thus, when the light receiving device 50 of the light is disposed so as to face the downstream-side end portion of the core 3, the light from the thick core effective portion (the inner portion 53 of the core 3) can be efficiently received by the light receiving device 50.

As a result, in the intermediate region 18, the light can be transmitted, while being confined, and in the one-side region 20, the light can be efficiently received by the light receiving device 50.

As shown in FIG. 5D, in the second step of the method for producing the optical waveguide 1, in the plurality of regions in the lengthwise direction, the infiltrating depth of the material for the clad is made different, so that the mixing layer 15 can include the plurality of regions each having a different thickness in the lengthwise direction.

In the method for producing the optical waveguide 1, in the plurality of regions, the reaction rate of the core 3 is made different, so that in the second step, when the core 3 is covered with the material for the over clad layer 4, in the plurality of regions in the lengthwise direction, the infiltrating depth D1 and D2 of the material for the over clad layer 4 can be easily and surely made different.

(Modified Example of Optical Waveguide)

In each of the following modified examples, the same reference numerals are provided for members and steps corresponding to each of those in the above-described one embodiment, and their detailed description is omitted. Also, each of the modified examples can be appropriately used in combination. Furthermore, each of the modified examples can achieve the same function and effect as that of the one embodiment unless otherwise specified.

In the one embodiment, as shown in FIGS. 3A to 3C, the mixing layer 15 is included in only the core 3.

Figure 6A:
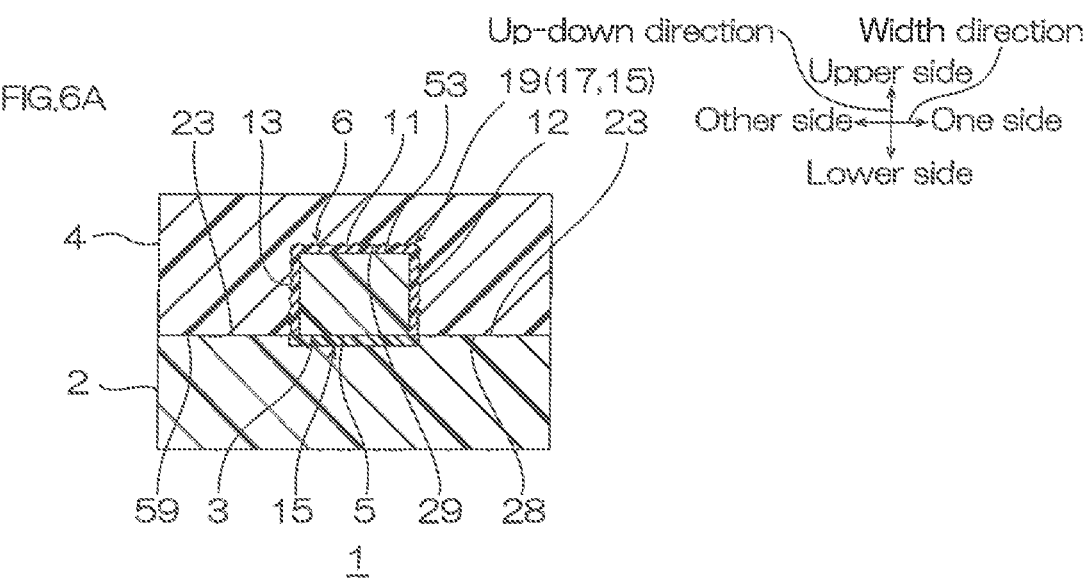
FIGS. 6A to 6C show front cross-sectional views of a modified example of the optical waveguide (modified example in which a mixing layer is also included in an under clad layer and faces the core) shown in FIGS. 3A to 3C.
Figure 6B:
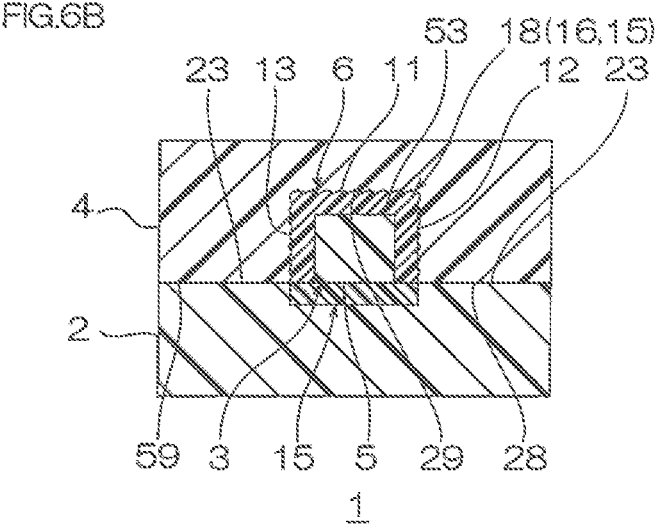
Figure 6C:
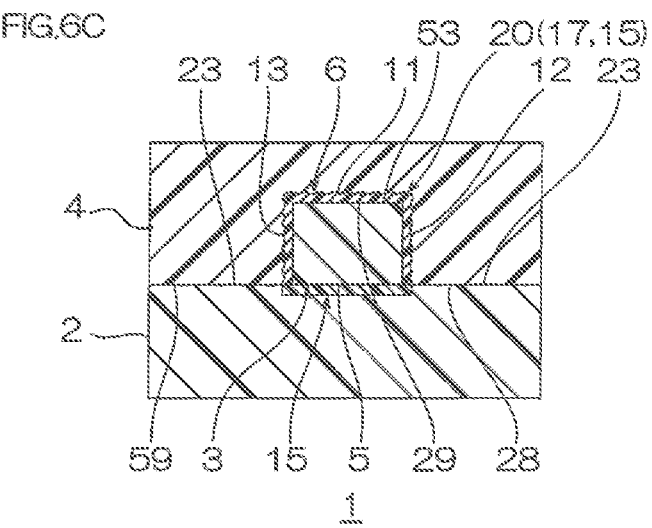

However, in the modified example, as shown in FIGS. 6A to 6C, the mixing layer 15 can be also further included in the under clad layer 2.

The mixing layer 15 included in the under clad layer 2 is formed along the first interface 5 of the under-side upper surface 23. The material for the mixing layer 15 included in the under clad layer 2 is a mixture of the materials for the core resin and the under clad. The entire mixing layer 15 included in the under clad layer 2 faces only the first interface 5 of the core 3.

Meanwhile, as shown in FIGS. 7A to 7B, the mixing layer 15 included in the under clad layer 2 can be included in a portion facing the first interface 5 and a portion facing the outer-side lower surface 59. That is, the mixing layer 15 included in the under clad layer 2 is provided along the entire under-side upper surface 23.

Of the one embodiment of FIGS. 3A to 3C, the modified example of FIGS. 6A to 6C, and the modified example of FIGS. 7A to 7C, preferably, the one embodiment of FIGS. 3A to 3C and the modified example of FIGS. 6A to 6C are used. In the one embodiment and the modified examples, as shown by the arrows of FIGS. 7A to 7B, a loss of the light caused by the light scattering toward both outer sides in the width direction via the portion facing the outer-side portion of the first interface 5 included in the under clad layer 2 can be prevented.

Furthermore, of the one embodiment of FIGS. 3A to 3C and the modified example of FIGS. 6A to 6C, the one embodiment of FIGS. 3A to 3C is more preferable than the modified example of FIGS. 6A to 6C.

As shown in FIGS. 8A to 8C, the mixing layer 15 can be also included in the over clad layer 4 without being included in the core 3. The mixing layer 15 is included in the over clad layer 4 along the second interface 6.

Figure 9A:
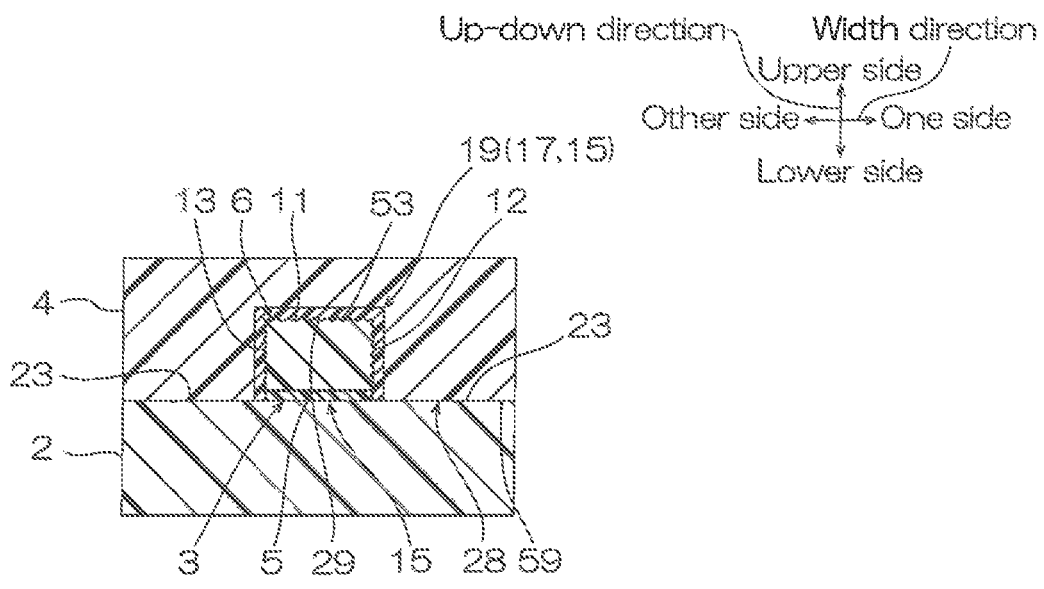
Figure 9B:
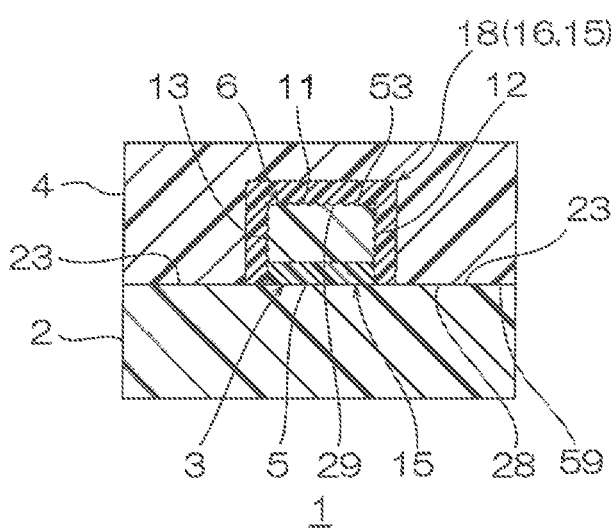
Figure 9C:
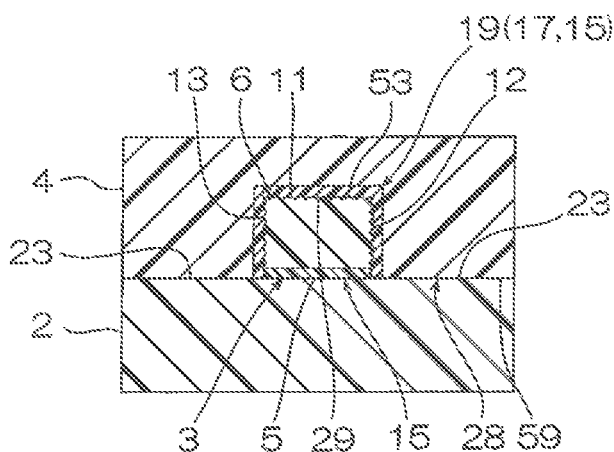
FIG. 9C illustrating a cross-sectional view of a one-side region.

Furthermore, as shown in FIGS. 9A to 9C, the mixing layer 15 along the first interface 5 can be also included in the core 3. That is, both of the mixing layer 15 along the first interface 5 and the thick layer region 16 along the second interface 6 are included in the core 3.

Figure 10A:
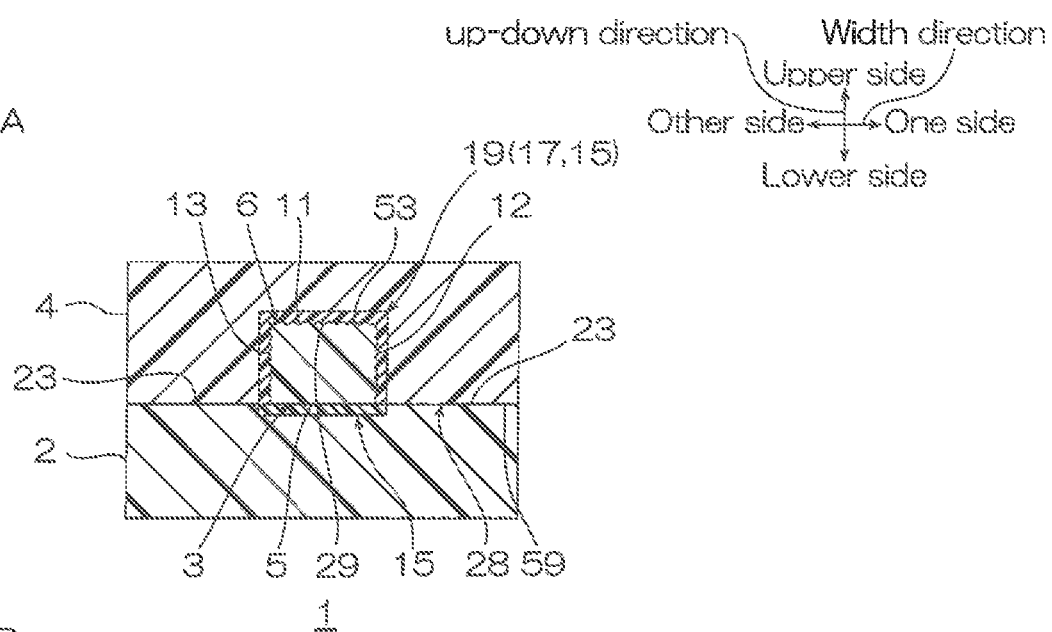
FIGS. 10A to 10C show front cross-sectional views of a modified example of the optical waveguide (modified example in which a mixing layer is included in a core and an over clad layer) shown in FIGS. 3A to 3C and 6A to 6C.
Figure 10B:
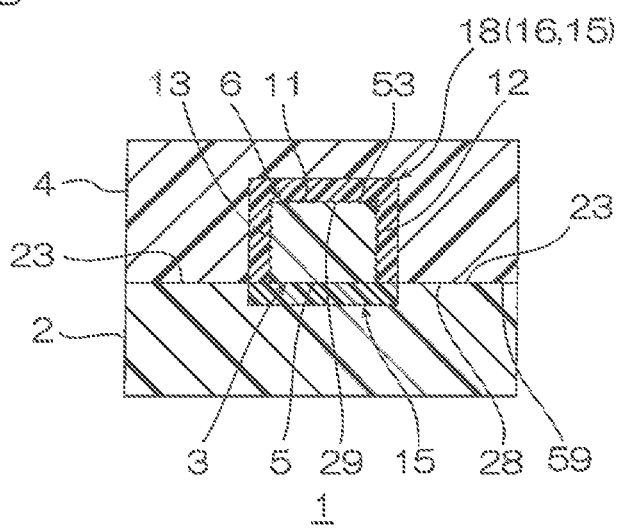
Figure 10C:
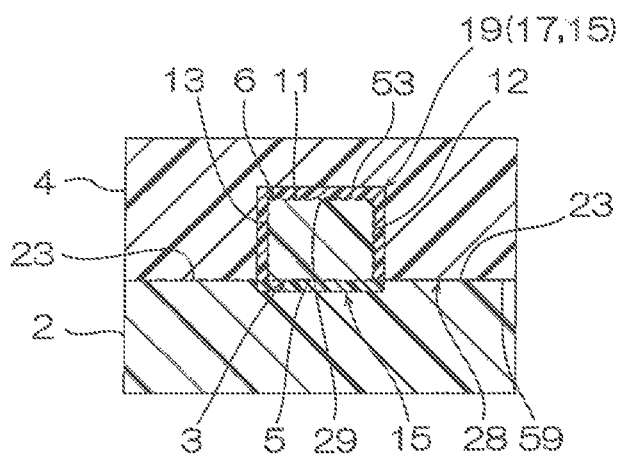

Furthermore, as shown in FIGS. 10A to 10C, the mixing layer 15 along the second interface 6 can be also included in the over clad layer 4, while the mixing layer 15 along the first interface 5 is included in the core 3.

Figure 11:
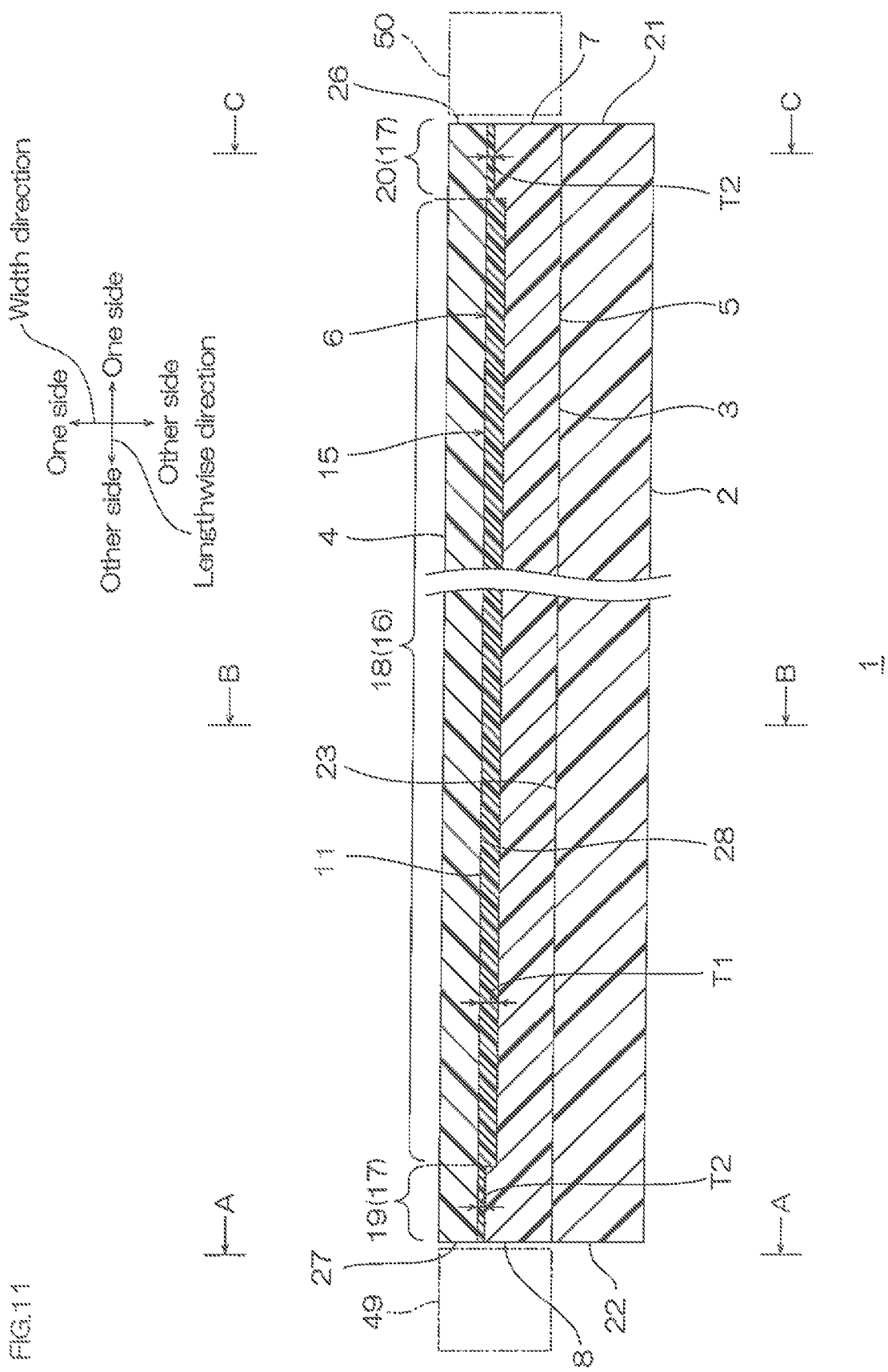
FIG. 11 shows a side cross-sectional view of a modified example of the optical waveguide (modified example in which a thickness of a mixing layer in a neighboring region is uniform) shown in FIG. 1.

As shown in FIG. 1, in the neighboring region 52 of each of the two thin layer regions 17 (that is, the other-side region 19 and the one-side region 20), the thickness continuously changes. Alternatively, for example, as shown in FIG. 11, the thickness may not change and be uniform in the entire thin layer region 17. That is, the thin layer region 17 does not have the neighboring region 52 (ref: FIG. 1).

In the modified example of FIG. 11, the thickness is discontinuous on the border between the thick layer region 16 and the thin layer region 17. That is, the mixing layer 15 has the two thickness of the first thickness T1 of the thick layer region 16 and the second thickness T2 of the thin layer region 17, and does not have the thickness between the first thickness T1 and the second thickness T2.

In the one embodiment shown in FIG. 1, the thin layer region 17 has both of the other-side region 19 and the one-side region 20.

Figure 12:
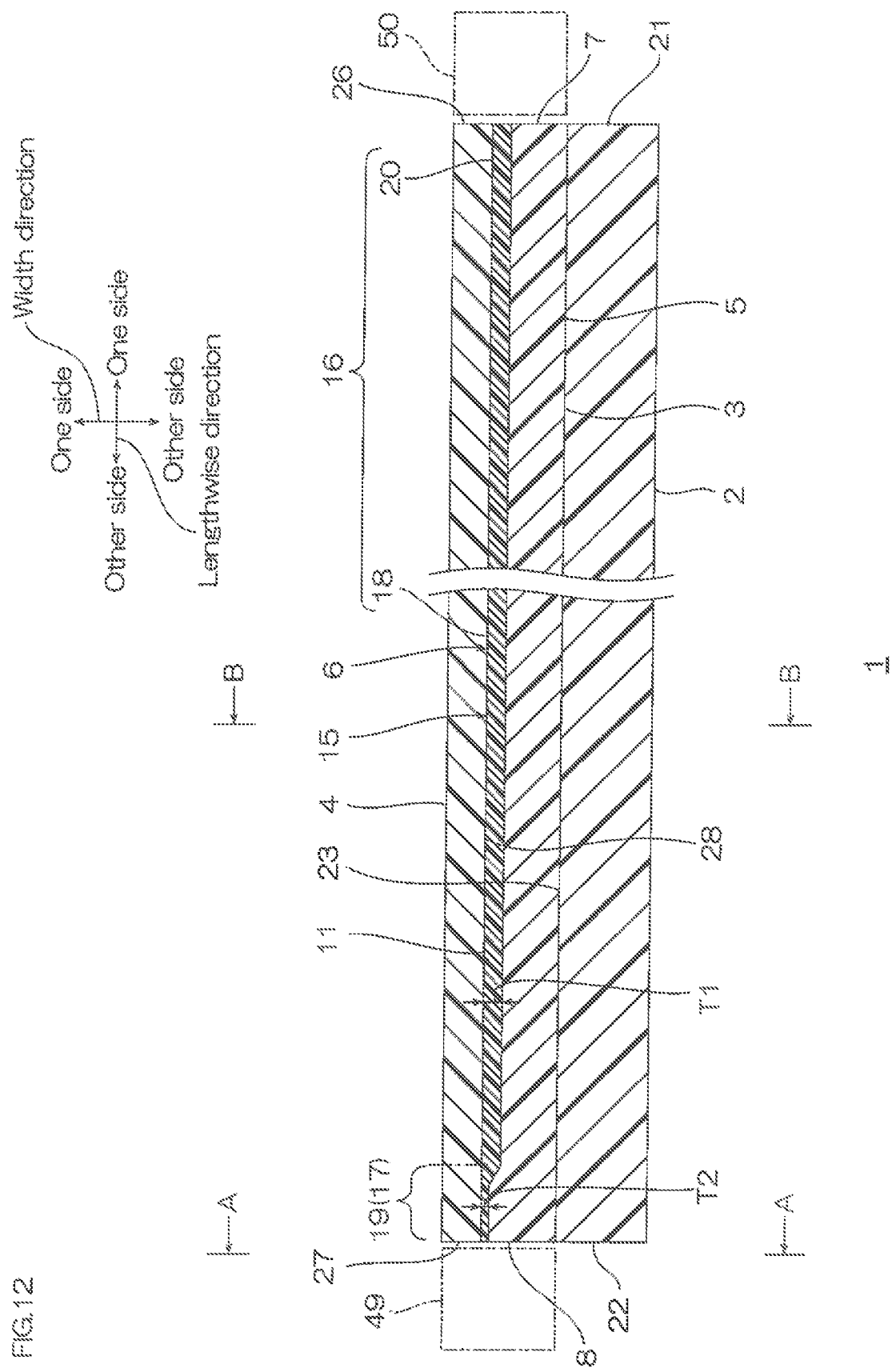
FIG. 12 shows a side cross-sectional view of a modified example of the optical waveguide (modified example in which a thick layer region includes an intermediate region and an other-side region) shown in FIG. 1.

Meanwhile, as shown in FIG. 12, in the modified example, the thin layer region 17 has only the other-side region 19. The one-side region 20 is included in the thick layer region 16. That is, the thick layer region 16 includes the intermediate region 18 and the one-side region 20.

Figure 13:
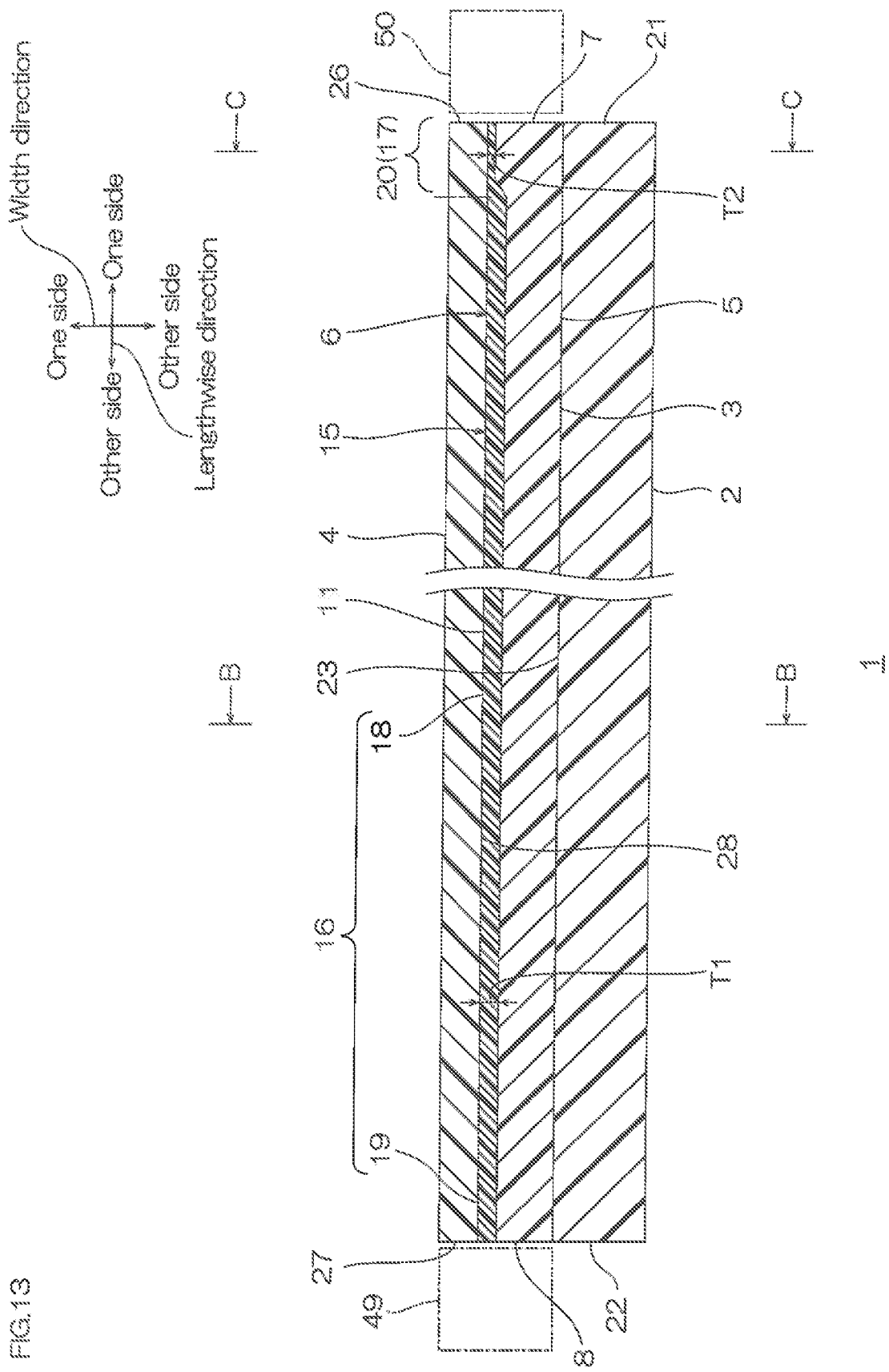
FIG. 13 shows a side cross-sectional view of a modified example of the optical waveguide (modified example in which a thick layer region includes an intermediate region and a one-side region) shown in FIG. 1.

On the other hand, as shown in FIG. 13, in the modified example, the thin layer region 17 has only the one-side region 20. The other-side region 19 is included in the thick layer region 16. That is, the thick layer region 16 includes the intermediate region 18 and the other-side region 19.

In the one embodiment shown in FIGS. 3A to 3C, the second interface 6 is a rough surface compared to the first interface 5 that is a flat surface. Alternatively, for example, though not shown, the second interface 6 may be a flat surface.

However, as in the one embodiment, even in an embodiment in which the second interface 6 is a rough surface and the above-described scattering of the light easily occurs, as shown in FIGS. 3A to 3C, the thickness of the mixing layer 15 is above the above-described maximum valley depth Zv in the entire region of the mixing layer 15, so that the above-described scattering of the light can be suppressed by allowing the light to surely go in the lengthwise direction before reaching the second interface 6.

(Use of Optical Waveguide)

The use of the optical waveguide 1 is not particularly limited, and can be used for various devices, preferably for various optical devices.

(Opto-Electric Hybrid Board and Opto-Electric Hybrid Module)

Next, an opto-electric hybrid board 30 including the above-described optical waveguide 1 and an opto-electric hybrid module 40 including the opto-electric hybrid board 30 are sequentially described with reference to FIGS. 14 to 16.

The opto-electric hybrid board 30 has a generally flat plate shape extending in the front-rear direction. The opto-electric hybrid board 30 transmits the light in the front-rear direction. The opto-electric hybrid board 30 has a generally T-shape when viewed from the top.

Figure 16:
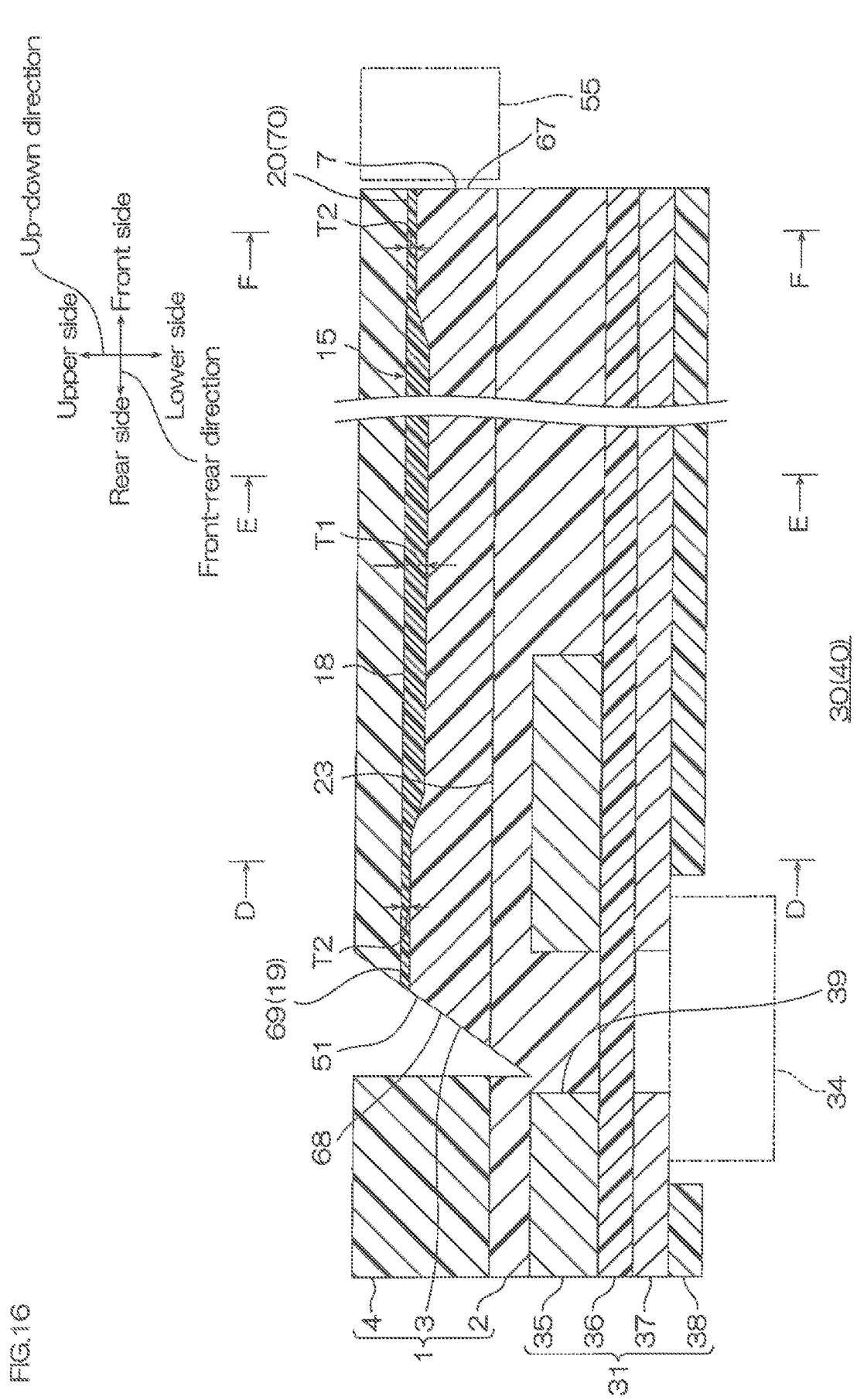
FIG. 16 shows a side cross-sectional view along a Y-Y line of the opto-electric hybrid board shown in FIG. 15.

As shown in FIG. 16, the opto-electric hybrid board 30 sequentially includes an electric circuit board 31 and the optical waveguide 1 upwardly.

The electric circuit board 31 forms the lower layer of the opto-electric hybrid board 30. The electric circuit board 31 is provided in the entire opto-electric hybrid board 30 when viewed from the top.

The electric circuit board 31 sequentially includes a metal supporting layer 35, a base insulating layer 36, a conductive layer 37, and a cover insulating layer 38 downwardly. To be specific, the electric circuit board 31 includes the metal supporting layer 35, the base insulating layer 36 that is disposed on the lower surface of the metal supporting layer 35, the conductive layer 37 that is disposed on the lower surface of the base insulating layer 36, and the cover insulating layer 38 that is disposed on the lower surface of the base insulating layer 36 so as to cover a part of the conductive layer 37. A material, a thickness, or the like of the metal supporting layer 35, the base insulating layer 36, the conductive layer 37, and the cover insulating layer 38 are, for example, described in Japanese Unexamined Patent Publications No. 2016-105160 and 2015-87634.

The upper surface of the metal supporting layer 35 is a flat surface. The metal supporting layer 35 is positioned in only the rear end portion of the electric circuit board 31. The metal supporting layer 35 has a plurality of opening portions 39. Each of the plurality of opening portions 39 has a mirror surface 51 to be described later when viewed from the top.

The optical waveguide 1 forms the upper layer of the opto-electric hybrid board 30. The optical waveguide 1 is disposed on the entire upper surface of the electric circuit board 31. The optical waveguide 1 is provided in the opto-electric hybrid board 30 so that the lengthwise direction in FIG. 1 is along the front-rear direction shown in FIG. 14.

To be more specific, the optical waveguide 1 is disposed in the opto-electric hybrid board 30 so that one side in the lengthwise direction thereof faces the front side and the other side in the lengthwise direction thereof faces the rear side. As shown in FIG. 15, the other-side region 19 in the mixing layer 15 is a rear-side region 69, and the one-side region 20 is a front-side region 70.

As shown in FIG. 16, in the optical waveguide 1, the under clad layer 2, the core 3, and the over clad layer 4 are sequentially disposed upwardly.

The under clad layer 2 covers the upper surfaces of the metal supporting layer 35 and the base insulating layer 36. The lower surface of the under clad layer 2 has a shape in conformity with the upper surfaces of the metal supporting layer 35 and the base insulating layer 36.

Figure 14:
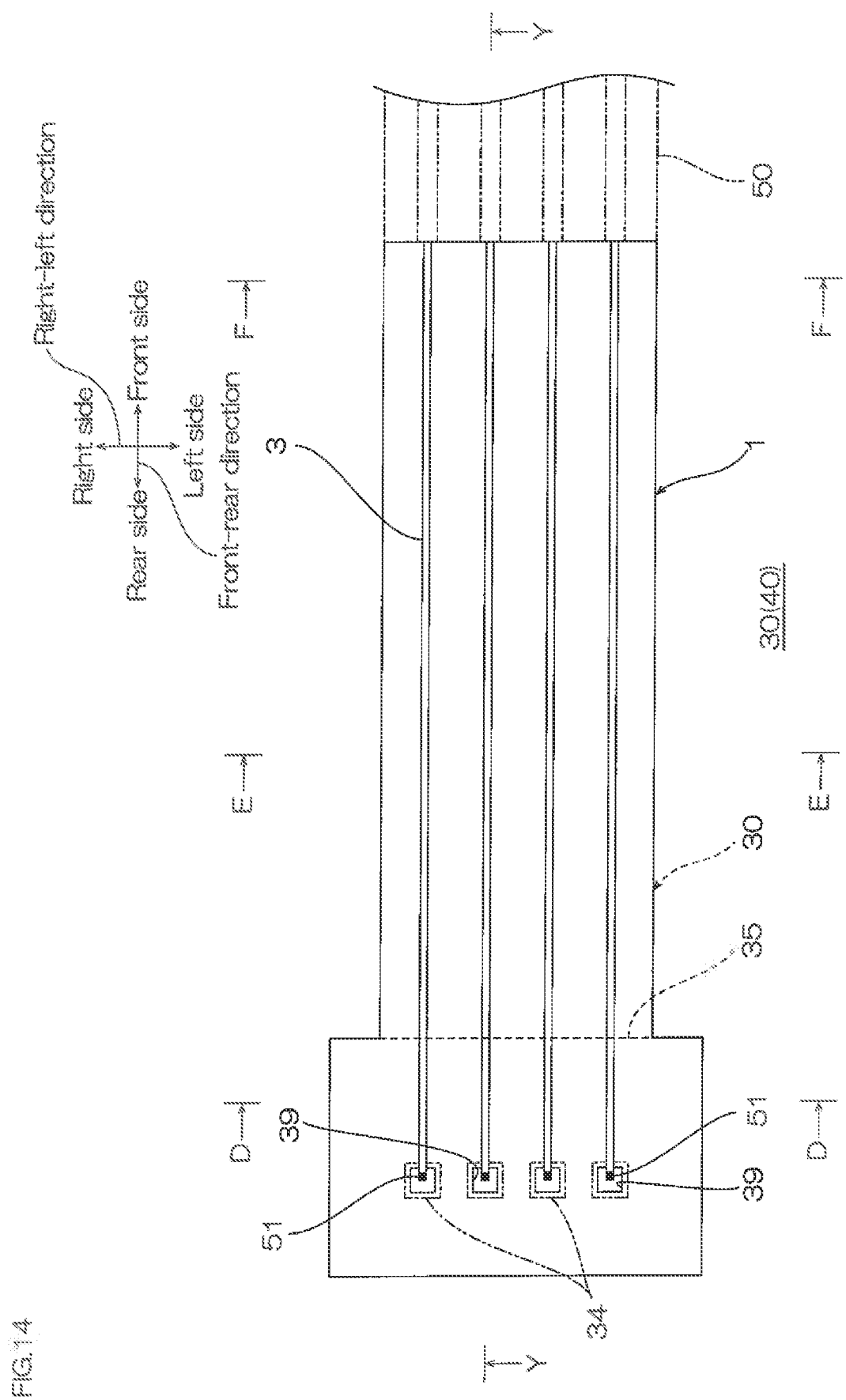
FIG. 14 shows a plan view of an opto-electric hybrid board including the optical waveguide shown in FIG. 1.

As shown in FIG. 14, the plurality of (four) cores 3 are disposed in alignment at spaced intervals to each other in the width direction. A rear end surface 68 (corresponding to the other-end surface 8 in the lengthwise direction) of each of the plurality of cores 3 is the mirror surface 51.

As shown in FIG. 16, the mirror surface 51 is an inclined surface having an angle of 45 degrees with respect to the under-side upper surface 23 of the under clad layer 31. The mirror surface 51 is a light transmission direction conversion member (or optical path conversion member) that changes the transmission direction of the light (light signal) entering from the optical element 34 from the up-down direction to the front-rear direction. That is, the mirror surface 51 receives the light emitted upwardly from the optical element 34 shown by a phantom line.

To produce the opto-electric hybrid board 30, for example, first, the electric circuit board 31 is produced (prepared), and subsequently, for example, the optical waveguide 1 is produced on the electric circuit board 31 in conformity with the above-described method.

Thereafter, the optical element 34 is mounted. In this manner, the optical element 34 is optically connected to the core 3.

In this manner, the opto-electric hybrid board 30 including the electric circuit board 31, the optical waveguide 1, and the optical element 34 is produced.

Then, when an external optical circuit 55 (phantom line) is connected to the obtained opto-electric hybrid board 30, the opto-electric hybrid module 40 can be constituted.

The opto-electric hybrid module 40 includes the opto-electric hybrid board 30 and the external optical circuit 55.

The external optical circuit 55 includes, for example, an optical fiber or the like. The external optical circuit 55 is disposed so as to face the front side of a front end surface 67 of the core 3 (corresponding to the one-end surface 7 in the lengthwise direction).

The opto-electric hybrid board 30 includes the above-described optical waveguide 1, so that it can be optically designed in accordance with its uses and purposes.

The opto-electric hybrid board 30 further includes the optical element 34 that is optically connected to the rear end surface 68 of the core 3, so that in the other-side region 19, the light from the optical element 34 can be efficiently received.

The opto-electric hybrid module 40 further includes the external optical circuit 55 that is optically connected to the front end surface 67 of the core 3, so that the light can be efficiently received from the thick core 3 (core effective portion) corresponding to the front-side region 70 by the external optical circuit 55.

(Modified Example of Opto-Electric Hybrid Board)

Figure 15:
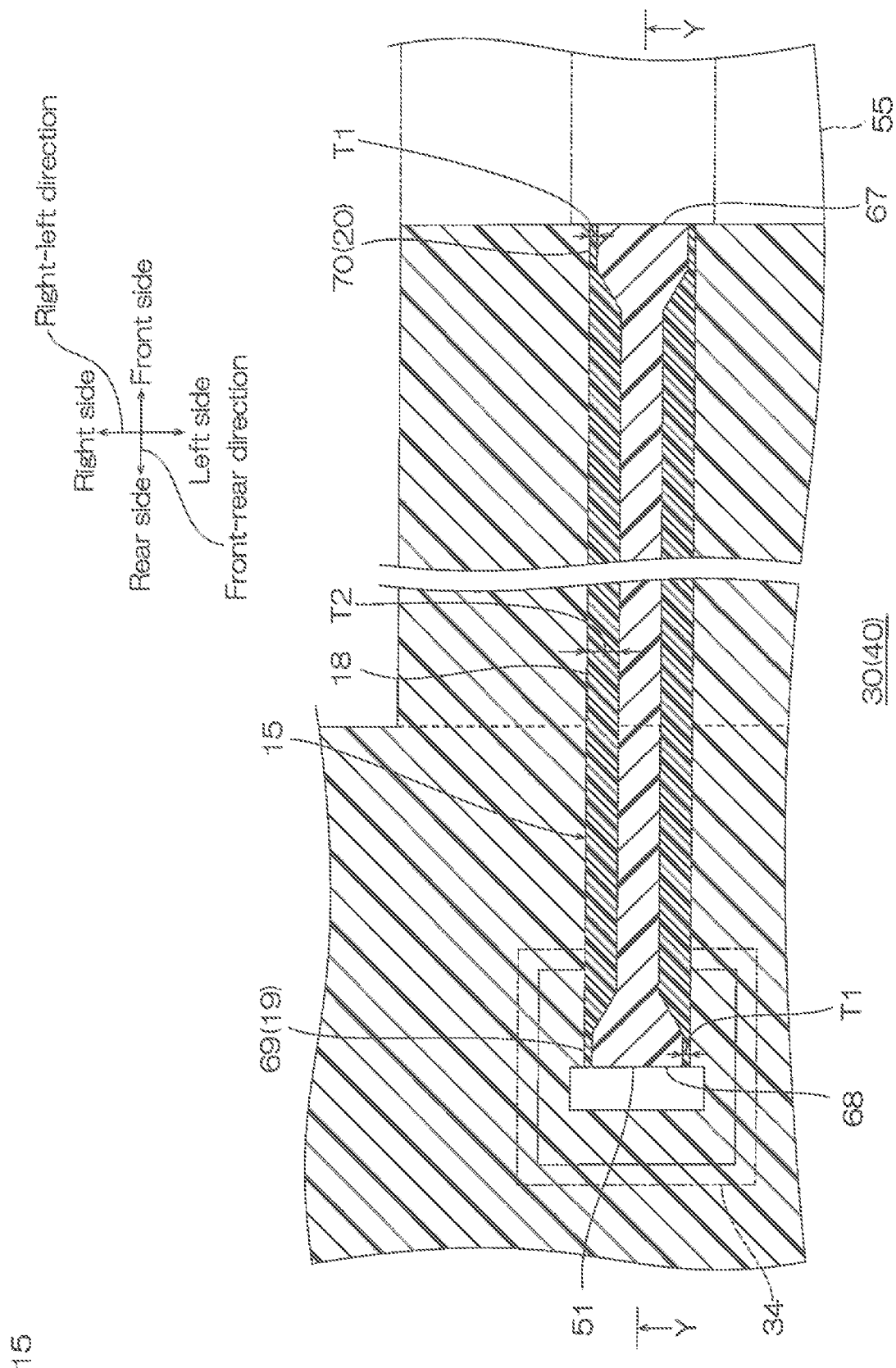
FIG. 15 shows an enlarged plan cross-sectional view of the opto-electric hybrid board shown in FIG. 14.

In the opto-electric hybrid board 30 shown in FIGS. 15 and 16, the mixing layer 15 in the rear-side region 69 and the front-side region 70 is thin with respect to that in the intermediate region 18. That is, the thickness of the mixing layer 15 is set based on the position only in the lengthwise direction in the mixing layer 15.

Figure 17:
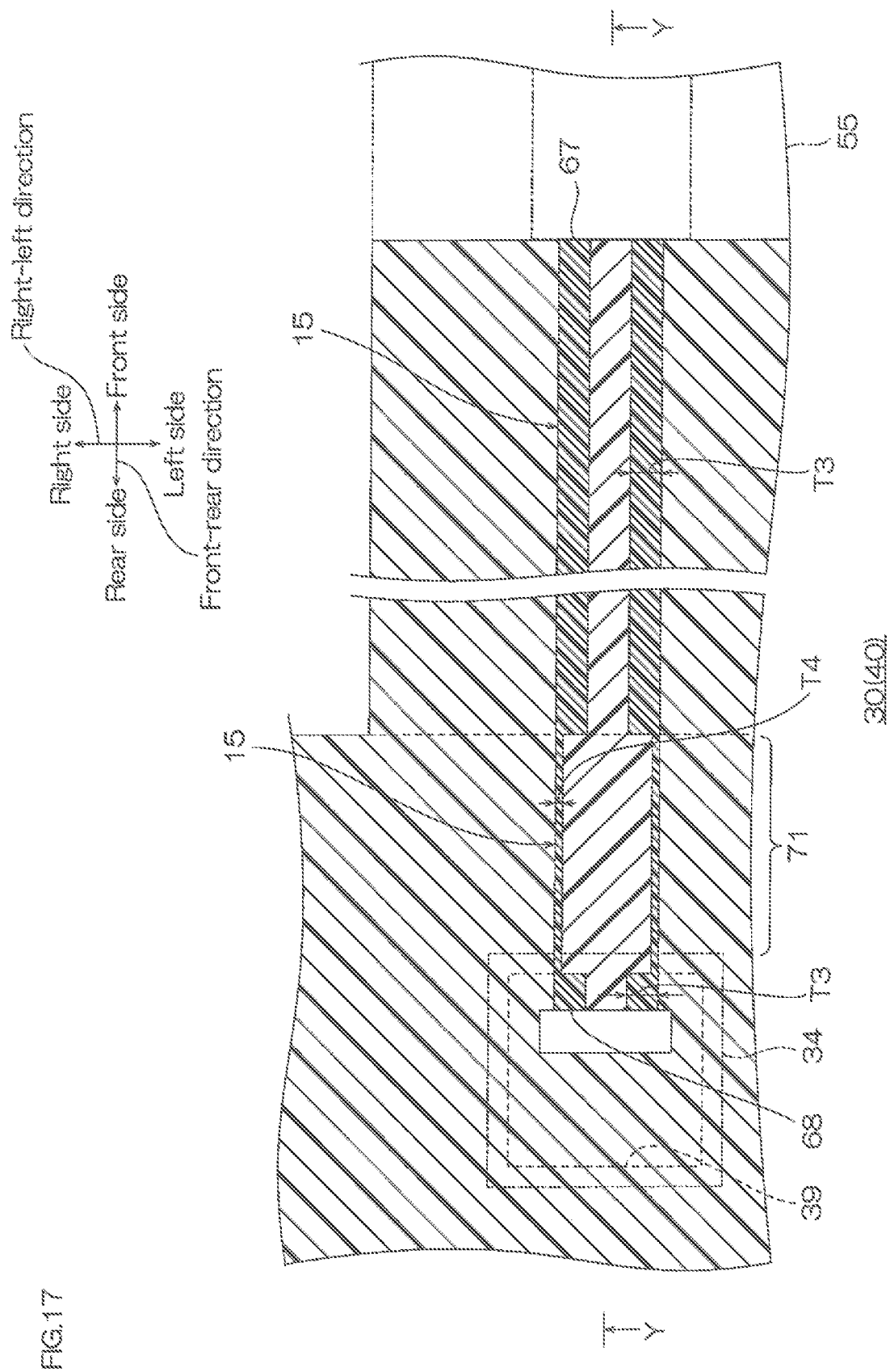
FIG. 17 shows an enlarged plan cross-sectional view of a modified example of the opto-electric hybrid board shown in FIG. 15.
Figure 18:
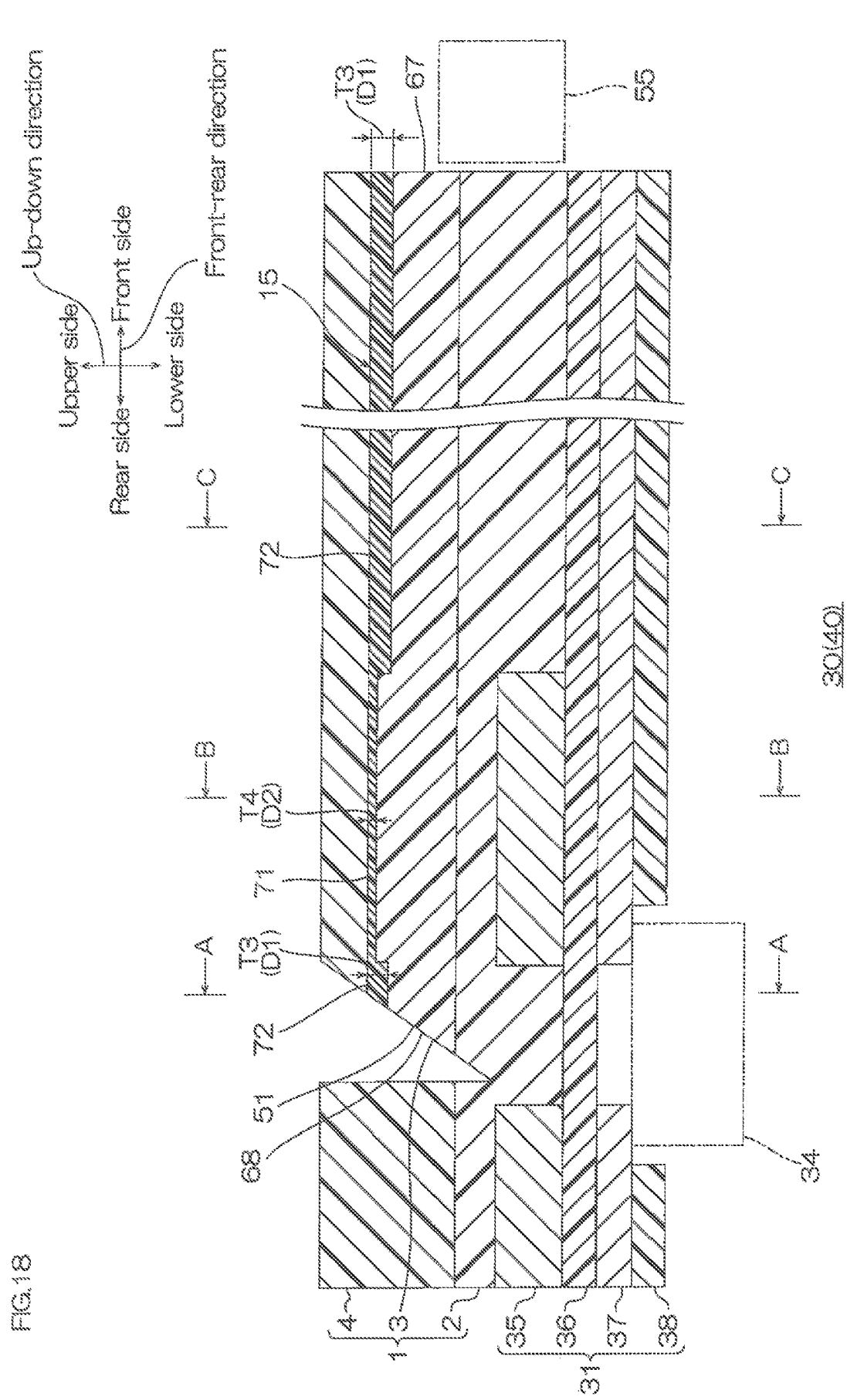
FIG. 18 shows a side cross-sectional view along a Y-Y line of the opto-electric hybrid board shown in FIG. 17.
Figure 19A:
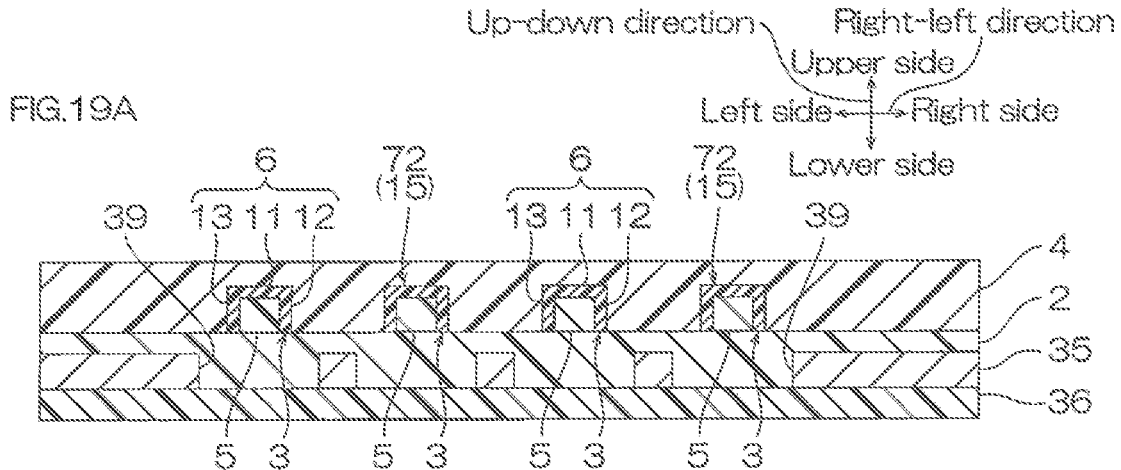
FIGS. 19A to 19C show front cross-sectional views of the optical waveguide shown in FIGS. 17 and 18.
Figure 19B:
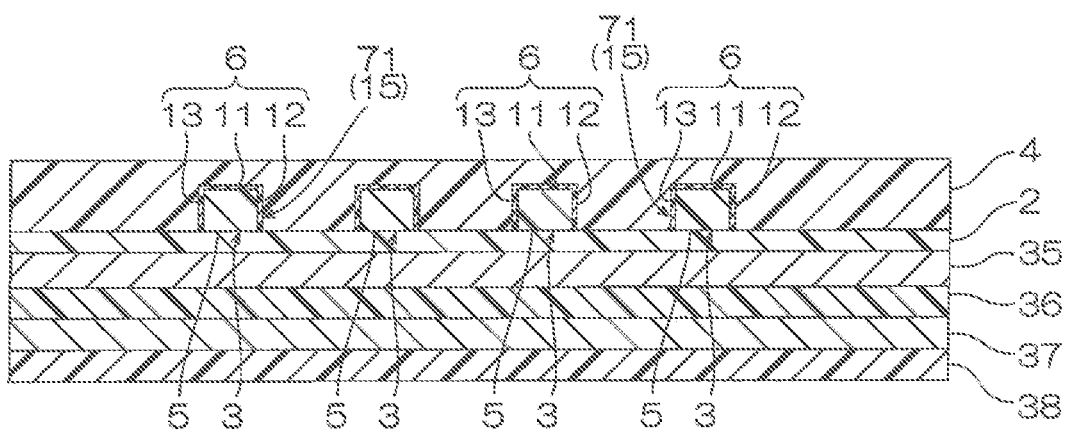
Figure 19C:
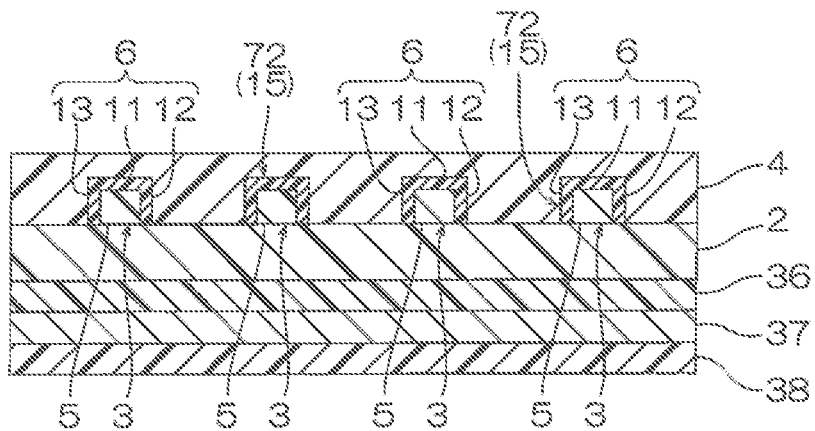

Meanwhile, as shown in FIGS. 17 and 18 (furthermore, in FIGS. 19A to 19C), however, the thickness of the mixing layer 15 can be also, for example, set based on a presence or absence of the overlapping with the metal supporting layer 35. To be specific, in the mixing layer 15, a thickness T4 of an overlapped region 71 that is overlapped with the metal supporting layer 35 can be set thin with respect to a thickness 13 of a non-overlapped region 72 that is not overlapped with the metal supporting layer 35 in the thickness direction.

As shown in FIGS. 17 and 18, the mixing layer 15 has the overlapped region 71 and the non-overlapped region 72.

The overlapped region 71 is a region that is overlapped with the metal supporting layer 35 (excluding the rear end portion of the core 3). The thickness T4 of the overlapped region 71 is the same as the second thickness T2 (relatively thin thickness T2) of the thin layer region 17.

The non-overlapped region 72 has a region corresponding to the front-side portion of the electric circuit board 31 and a region corresponding to the rear end portion of the core 3. In the non-overlapped region 72, the rear end portion of the core 3 includes the rear end surface 68, and is included in the opening portion 39 when viewed from the top. That is, the rear end portion of the core 3 is not overlapped with the metal supporting layer 35 in the thickness direction. The thickness T3 of the non-overlapped region 72 is the same as the first thickness T1 (relatively thick thickness T1) of the thick layer region 16.

Next, a method for producing the opto-electric hybrid board 30 is described with reference to FIGS. 20A to 21D.

As shown in FIG. 20A, first, the electric circuit board 31 sequentially including the metal supporting layer 35, the base insulating layer 36, the conductive layer 37, and the cover insulating layer 38 downwardly is fabricated.

As shown in FIG. 20B, next, the under clad layer 2 is produced on the lower surface of the electric circuit board 31. The under clad layer 2 fills the inside of the opening portion 39. Thus, the lower surface of the under clad layer 2 has a protruding portion corresponding to the opening portion 39. Meanwhile, the under clad layer 2 has the under-side upper surface 23 that is a flat surface.

As shown in FIG. 20C, next, the core 3 is formed on the under-side upper surface 23 of the under clad layer 2.

As shown in FIG. 21A, to be specific, the above-described varnish 45 is applied onto the under-side upper surface 23 and thereafter, the varnish 45 is dried, thereby forming the photosensitive film 24. Or, the photosensitive film 24 is formed from a dry film resist.

As shown in FIG. 21B, thereafter, the photomask 25 having the light shielding portion 41 and the light transmittance portion 42 is disposed at the upper side of the photosensitive film 24.

The light transmittance portion 42 does not have the gradation pattern as in the one embodiment (ref: FIG. 5B), and the light transmittance is the same (uniform) in the front-rear direction. The light transmittance portion 42 has a pattern having the same pattern as that of the core 3. The light transmittance portion 42 has a pattern also corresponding to the core 3 at the inside of the opening portion 39.

As shown in FIG. 21B, next, the photosensitive film 24 is exposed to light via the photomask 25. To be specific, an active energy ray is applied to (exposed to) the photosensitive film 24 from the upper side (one example of one side in the thickness direction) toward the lower side (one example of the other side in the thickness direction) of the photomask 25 via the photomask 25 (first step).

Then, in the light shielding portion 41, the light is shielded, and the photosensitive film 24 facing the light shielding portion 41 is not exposed to light (does not receive the light).

Meanwhile, in the light transmittance portion 42, the light transmits, and the photosensitive film 24 facing the light transmittance portion 42 is exposed to light. To be more specific, the photosensitive film 24 corresponding to the non-overlapped region 72 is exposed to light once from the upper side toward the lower side by the light transmitting through the light transmittance portion 42.

On the other hand, the photosensitive film 24 corresponding to the overlapped region 71 is exposed to light once from the upper side toward the lower side by the light transmitting through the light transmittance portion 42. Thereafter, the light transmits through the under clad layer 2 downwardly, subsequently, is reflected on the upper surface of the metal supporting layer 35 upwardly, and furthermore, transmits through the under clad layer 2 upwardly, so that the photosensitive film 24 corresponding to the overlapped region 71 is exposed to light. That is, the photosensitive film 24 corresponding to the overlapped region 71 is exposed to light twice in total.

In short, the photosensitive film 24 corresponding to the overlapped region 71 is exposed to light one more time than the photosensitive film 24 corresponding to the non-overlapped region 72. In other words, an amount of the exposed light with respect to the photosensitive film 24 corresponding to the overlapped region 71 is larger than the amount of the exposed light with respect to the photosensitive film 24 corresponding to the non-overlapped region 72.

Subsequently, the photosensitive film 24 is developed, and a portion corresponding to the light shielding portion 41 is removed.

Accordingly, in this manner, as shown in FIG. 21C, the photosensitive film 24 corresponding to the overlapped region 71 is the high reaction rate portion 47, and the photosensitive film 24 corresponding to the non-overlapped region 72 is the low reaction rate portion 46. Then, the core 3 having the high reaction rate portion 47 and the low reaction rate portion 46 is formed.

As shown in FIG. 21D, thereafter, the core 3 is covered with the material for the over clad layer 4. To be specific, the varnish 45 is applied so as to cover the core 3.

Subsequently, a relatively large amount of over clad resin infiltrates into the low reaction rate portion 46, while a relatively small amount of over clad resin infiltrates into the high reaction rate portion 47.

The infiltrating depth D1 of the over clad resin in the low reaction rate portion 46 is relatively deep, while the infiltrating depth D2 of the over clad resin in the high reaction rate portion 47 is relatively shallow. That is, the infiltrating depth of the over clad resin is made different between the low reaction rate portion 46 and the high reaction rate portion 47.

Then, the thick mixing layer 15 (the non-overlapped region 72) corresponding to the low reaction rate portion 46 and the thin mixing layer 15 (the overlapped region 71) corresponding to the high reaction rate portion 47 are formed.

As shown in FIG. 20D, in this manner, the over clad layer 4 is formed (third step).

Thereafter, as shown in FIG. 20E, the mirror surface 51 is formed in the rear end portion of the core 3 by, for example, laser processing or cutting processing.

As shown in FIG. 18, thereafter, the optical element 34 is mounted on the electric circuit board 31 so that an emission port of the optical element 34 faces the mirror surface 51 in the up-down direction. In this manner, the optical element 34 is optically connected to the core 3.

In this manner, the opto-electric hybrid board 30 is produced.

Thereafter, the external optical circuit 55 is disposed so as to face the front end surface 67 of the core 3 in the opto-electric hybrid board 30. In this manner, the optical element 34 is optically connected to the external optical circuit 55 via the optical waveguide 1 of the opto-electric hybrid board 30.

In this manner, the opto-electric hybrid module 40 including the opto-electric hybrid board 30 and the external optical circuit 55 is produced.

In the first step of the above-described method for producing the opto-electric hybrid board 30, the photosensitive film 24 is exposed to light from the upper side downwardly, so that of the photosensitive film 24, the overlapped region 71 is excessively exposed to light by the light reflected on the metal supporting layer 35. Meanwhile, the non-overlapped region 72 is not excessively exposed to light as in the overlapped region 71, and can be exposed to light as intended.

Thus, the reaction rate of the photosensitive film 24 corresponding to the overlapped region 71 is lower than that of the photosensitive film 24 corresponding to the non-overlapped region 72.

Thus, in the third step, the thickness T4 of the mixing layer 15 in the overlapped region 71 with respect to the thickness T3 of the mixing layer 15 in the non-overlapped region 72 is thin.

Accordingly, the thickness T3 and the thickness T4 of the mixing layer 15 can be easily made different based on the reflection by the metal supporting layer 35.

(Modified Example)

In the description above, the infiltrating depth D of the over clad resin (consequently, the thickness r of the mixing layer 15) is made different in accordance with the reaction rate of the photosensitive film 24. That is, the infiltrating depth D of the over clad resin is made different by a difference of the reaction rate of the photosensitive film 24 based on the gradation of the photomask 25 in the one embodiment shown in FIGS. 5A to 5D, or by a difference of the reaction rate of the photosensitive film 24 based on a presence or absence of the reflection of the metal supporting layer 35 in the modified example shown in FIGS. 21A to 21D.

However, the infiltrating depth D of the over clad resin can be also made different by changing, for example, the conditions in any step such as conditions of heating after exposure to light, flowability of the varnish containing the over clad resin, drying temperature of the varnish, and furthermore, molecular design of the material for the core 3 with the material for the over clad layer 4 (to be specific, bulkiness of a molecule or the like).

Each of the embodiments and each of the modified examples described above can be appropriately used in combination.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The optical waveguide is included in the opto-electric hybrid board.

DESCRIPTION OF REFERENCE NUMERALS

1 Optical waveguide
2 Under clad layer
3 Core
4 Over clad layer
15 Mixing layer
16 Thick layer region
17 Thin layer region
18 Intermediate region
19 Other-side region
20 One-side region
30 Opto-electric hybrid board
31 Electric circuit board
34 Optical element
Metal supporting layer
Opto-electric hybrid module
49 Incident device
50 Light receiving device
55 External optical circuit
T1 First thickness
T2 Second thickness
Zv Maximum valley depth

The invention claimed is:

1. An optical waveguide comprising:
a core extending in a transmission direction of light,
a clad covering the core along the transmission direction, and
a mixing layer containing a material for the core and a material for the clad on the interface between the core and the clad, and
the mixing layer includes a plurality of regions each having a different thickness in the transmission direction.

2. The optical waveguide according to claim 1, wherein the mixing layer is included in the core.

3. The optical waveguide according to claim 1, wherein in the entire region of the mixing layer, a thickness of the mixing layer is above a maximum valley depth Zv of the interface between the core and the clad.

4. The optical waveguide according to claim 1, wherein the plurality of regions include
a thick layer region having a first thickness T1 and a thin layer region having a second thickness T2 that is thinner than the first thickness T1, and
a ratio (T1/T2) of the first thickness T1 to the second thickness T2 is 1.5 or more.

5. The optical waveguide according to claim 1, wherein the plurality of regions include a first region positioned at an upstream-side end portion of the core in the transmission direction and
a second region positioned at the downstream side with respect to the first region, and
a thickness of the mixing layer in the second region is thicker than that of the mixing layer in the first region.

6. The optical waveguide according to claim 1, wherein the plurality of regions include
a third region positioned at the downstream-side end portion of the core in the transmission direction and
a second region positioned at the upstream side with respect to the third region, and the mixing layer in the second region is thicker than the mixing layer in the third region.

7. An opto-electric hybrid board sequentially comprising:
the optical waveguide according to claim 1 and an electric circuit board in a thickness direction.

8. The opto-electric hybrid board according to claim 7, wherein
the electric circuit board includes a metal supporting layer;
the optical waveguide has
an overlapped region that is overlapped with the metal supporting layer and
a non-overlapped region that is not overlapped with the metal supporting layer when projected in the thickness direction; and
the mixing layer in the non-overlapped region is thicker than the mixing layer in the overlapped region.

9. The opto-electric hybrid board sequentially comprising:
the optical waveguide according to claim 5 and an electric circuit board in the thickness direction and
further comprising an optical element optically connected to the upstream-side end edge in the transmission direction of the core.

10. An opto-electric hybrid module sequentially comprising:
the optical waveguide according to claim 6 and an electric circuit board in a thickness direction and further comprising:
an external optical circuit optically connected to a downstream-side end edge in the transmission direction of the core.

* * * * *